US007548553B2

(12) United States Patent
Meier

(10) Patent No.: US 7,548,553 B2
(45) Date of Patent: *Jun. 16, 2009

(54) REDUNDANT RADIO FREQUENCY NETWORK HAVING A ROAMING TERMINAL COMMUNICATION PROTOCOL

(75) Inventor: Robert C. Meier, Cedar Rapids, IA (US)

(73) Assignee: Broadcom Corporation, Irvine, CA (US)

( * ) Notice: Subject to any disclaimer, the term of this patent is extended or adjusted under 35 U.S.C. 154(b) by 508 days.

This patent is subject to a terminal disclaimer.

(21) Appl. No.: 11/223,404

(22) Filed: Sep. 9, 2005

(65) Prior Publication Data

US 2006/0062240 A1 Mar. 23, 2006

Related U.S. Application Data

(63) Continuation of application No. 10/762,746, filed on Jan. 22, 2004, now Pat. No. 7,386,002, which is a continuation of application No. 09/960,265, filed on Sep. 21, 2001, now Pat. No. 6,714,559, which is a continuation of application No. 09/849,776, filed on May 4, 2001, now abandoned, which is a continuation of application No. 09/482,197, filed on Jan. 12, 2000, now abandoned, which is a continuation of application No. 08/941,496, filed on Sep. 30, 1997, now abandoned, which is a continuation of application No. 08/270,533, filed on Jul. 5, 1994, now Pat. No. 5,673,031, which is a continuation-in-part of application No. 07/802,348, filed on Dec. 4, 1991, now abandoned, which is a continuation-in-part of application No. 07/790,946, filed on Nov. 12, 1991, now abandoned.

(51) Int. Cl.
*H04Q 1/00* (2006.01)
(52) U.S. Cl. .................................... 370/449; 340/3.51

(58) Field of Classification Search ................. 370/338, 370/346, 447, 449; 340/3.51
See application file for complete search history.

(56) References Cited

U.S. PATENT DOCUMENTS 4,063,220 A 12/1977 Metcalfe et al.

(Continued)

FOREIGN PATENT DOCUMENTS

JP 53-10206 1/1978

(Continued)

OTHER PUBLICATIONS

Fapojuwo et al., "Message and Packet Access Delays in CSMA-DC Local Area Networks", In Proceedings of the 8th Annual Joint Conference of the IEEE Computer and Communications Societies, INFOCOM'89, "Technology: Emerging or Converging?" pp. 849-857, vol. 3, Call No. 10.1109/INFOCOM.1989.101535, Apr. 27, 1989.

(Continued)

*Primary Examiner*—Edwin C Holloway, III
(74) *Attorney, Agent, or Firm*—McAndrews, Held & Malloy, Ltd.

(57) ABSTRACT

Disclosed herein is a redundant network and communication protocol at least including host computers, RF base stations, and roaming terminals. The network may utilize a polling communication protocol such that under heavy traffic conditions, a roaming terminal wishing to initiate communication may be required to determine whether the channel is clear by listening for an entire interpoll gap time. When a hidden terminal is communicating, the roaming terminal may conclude that the communication is taking place upon receiving a polling frame directed to the hidden terminal from the normally silent base station. Inherent redundancy techniques may be used with a spanning tree approach for determining the most efficient pathways from a source to a destination and ensuring that the network adapts to spatial changes or breakdowns within the network.

44 Claims, 6 Drawing Sheets

U.S. PATENT DOCUMENTS

| | | | |
|---|---|---|---|
| 4,251,865 A | | 2/1981 | Moore et al. |
| 4,332,027 A | | 5/1982 | Malcolm |
| 4,352,955 A | | 10/1982 | Kai et al. |
| 4,369,443 A | | 1/1983 | Giallanza et al. |
| 4,477,809 A | | 10/1984 | Bose |
| 4,661,902 A | | 4/1987 | Hochsprung |
| 4,670,899 A | | 6/1987 | Brody et al. |
| 4,679,244 A | | 7/1987 | Kawasaki et al. |
| 4,689,786 A | | 8/1987 | Sidhu |
| 4,707,829 A | | 11/1987 | Pendse |
| 4,807,222 A | | 2/1989 | Amitay |
| 4,881,271 A | | 11/1989 | Yamauchi et al. |
| 4,910,794 A | | 3/1990 | Mahany |
| 4,945,532 A | | 7/1990 | Hald |
| 4,987,571 A | | 1/1991 | Haymond |
| 5,042,083 A | | 8/1991 | Ichikawa |
| 5,058,200 A | | 10/1991 | Hung et al. |
| 5,070,536 A | | 12/1991 | Mahany et al. |
| 5,142,550 A | | 8/1992 | Tymes |
| 5,164,942 A | | 11/1992 | Kamerman et al. |
| 5,164,985 A | * | 11/1992 | Nysen et al. ................ 380/271 |
| 5,170,394 A | | 12/1992 | Biber et al. |
| 5,175,537 A | | 12/1992 | Jaffe |
| 5,214,647 A | | 5/1993 | Komatsu |
| 5,295,154 A | | 3/1994 | Meier |
| 5,359,320 A | | 10/1994 | Jaffe et al. |
| 5,471,469 A | | 11/1995 | Flammer et al. |
| 5,485,147 A | | 1/1996 | Jaffe |
| 5,625,825 A | | 4/1997 | Rostoker |
| 5,673,031 A | | 9/1997 | Meier |
| 5,687,175 A | | 11/1997 | Rochester et al. |
| 6,714,559 B1 | | 3/2004 | Meier |

FOREIGN PATENT DOCUMENTS

| | | |
|---|---|---|
| JP | 58159036 | 9/1983 |
| JP | 61100041 | 5/1986 |
| JP | 61251251 | 11/1986 |
| JP | 1117533 | 5/1989 |
| JP | 1119146 | 5/1989 |
| JP | 1152837 | 5/1989 |
| JP | 1143536 | 6/1989 |
| JP | 1305637 | 12/1989 |
| JP | 2051922 | 2/1990 |
| JP | 3268534 | 11/1991 |
| JP | 4123628 | 4/1992 |
| JP | 4199934 | 7/1992 |
| JP | 4259140 | 9/1992 |
| JP | 5253132 | 10/1993 |
| WO | WO 96-10304 | 4/1996 |

OTHER PUBLICATIONS

Fapojuwo et al., "Multipacket Message Transmission on CSMA-CD LANs using Limited and Gated Strategies", In Proceedings of the IEEE Pacific Rim Conference on Communications, Computers and Signal Processing, pp. 12-15, Call No. 10.1109/PACRIM.1989. 48294, Jun. 6, 1989.

Fapojuwo et al., "Stability Consideration of Buffered CSMA/CD System with Multipacket Messages", Electronic Letters, vol. 25, No. 2, pp. 122-124, Jan. 29, 1989.

W. Stallings, Local and Metropolitan Area Networks, 1997, pp. 378-383.

Andrews, et al., "Inside Apple Talk, $2^{nd}$ Edition", Addison-Wesley Publishing Company, 1990.

Fakhouri et al., "Coding And Multiple Access Techniques For Data Transmission In Land-Mobile Satellite Networks", IEEE Pacific Rim Conference On Communications, Computers And Signal Processing, pp. 410-413, May 9-10, 1991.

Glass et al., "Broad-Band Networks For LAN And Radio Applications", IEEE $38^{th}$ Vehicular Technology Conference, pp. 44-51, Jun. 15-17, 1988.

Hashemi et al., "An Efficient Reservation System For Local Area Networks Based On CSMA/CD", IEEE Pacific Rim Conference On Communications, Computers And Signal Processing, pp. 1-4, Jun. 1-2, 1989.

Hu et al., "Collision Resolution Algorithms For CDMA Systems", IEEE Journal On Selected Areas In Communications, vol. 8, Ho. 4, pp. 542-554, May 1990.

Karn, "MACA—A New Channel Access Method For Packet Radio", ARRL/CRRL Amateur Radio $9^{th}$ Computer Networking Conference, pp. 134-140, Sep. 1990.

Kleinrock et al., "Packet Switching In Radio Channels: New Conflict-Free Multiple Access Schemes", IEEE Transactions On Communications, vol. COM-28, No. 7, pp. 1015-1029, Jul. 1980.

Kleinrock, "On Queueing Problems In Random-Access Communications", IEEE Transactions On Information Theory, vol. IT-31, No. 2, pp. 166-175, Mar. 1985.

Kleinrock, "On Resource Sharing In A Distributed Communication Network", IEEE Communications Magazine, pp. 27-34, Jan. 1979.

Leiner et al., "Issues In Packet Radio Network Design", IEEE Proceedings, vol. 75, No. 1, pp. 6-20, Jan. 1987.

Onunga et al., "Personal Computer Communications On Intrabuilding Power Line LAN's Using CSMA With Priority Acknowledgements", IEEE Journal On Selected Areas In Communications, vol. 7, No. 2, pp. 180-191, Jan. 1989.

Peha et al., "Implementation Strategies For Scheduling Algorithms In Integrated-Services Packet-Switched Networks", Global Telecommunications Conference, 1991, Globecom '91, pp. 1733-1740, Dec. 2-5, 1991.

Scholl et al., "On A Mixed Mode Multiple Access Scheme For Packet-Switched Radio Channels", IEEE Transactions On Communications, vol. COM-27, No. 6, pp. 906-911, Jun. 1979.

Takagi et al., "A Tutorial On The Analysis Of Polling Systems", Computer Science Dept., Univ. Of Calif., Los Angeles, Jun. 1, 1984.

Tan et al., "A New Free-Access Collision Resolution Algorithm Based Connection Request procedure For Land Mobile Satellite Systems", INFOCOM '89, Eighth Annual Joint Conference Of The IEEE Computer And Communications Societies Proceedings, pp. 1057-1062, 1989.

Tanenbaum, Computer Networks, Prentice-Hall, Inc., 1981.

Tanenbaum, Computer Networks, $2^{nd}$ Edition, Prentice-Hall, Inc., 1988.

Tobagi et al, "Packet Switching In Radio Channels: Part IV Stability Considerations And Dynamic Control In Carrier Sense Multiple Access", IEEE Transactions On Communications, vol. COM-25, No. 10, pp. 1130-1119, Oct. 1977.

Tobagi et al., "Packet Radio And Satellite Networks", IEEE Communications Magazine, vol. 22, No. 11, pp. 24-40, Nov. 1984.

Tobagi et al., "Packet Switching In Radio Channels: Part III-Polling and (Dynamic) Split-Channel Reservation Multiple Access", IEEE Transactions On Communications, vol. COM-24, No. 8, pp. 832-845, Aug. 1976.

Tobagi et al., "Packet Switching In Radio Channels: Part 1-Carrier Sense Multiple-Access And Their Throughput-Delay Characteristics", IEEE Transactions On Communications, vol. CCOM-23, No. 12, pp. 1400-1416, Dec. 1975.

Tobagi et al., "Packet Switching In Radio Channels: Part II-The Hidden Terminal Problem In Carrier Sense Multiple-Access And The Busy-Tone Solution", IEEE Transactions On Communications, vol. CCOM-23, No. 12, pp. 1417-1433, Dec. 1975.

Tobagi, "Multiaccess Protocols In Packet Communication System", IEEE Transactions On Communications, vol. COM-28, No. 4, pp. 468-488, Apr. 1980.

Yue, "Performance Analysis Of Cellular Mobile Radio Systems Using Slotted ALOHA Protocol With Capture", IEEE Pacific Rim Conference On Communications, Computers And Signal Processing, pp. 550-553, May 9-10, 1991.

Plaintiff and Counterdefendant Qualcomm Incorporated's Preliminary Invalidity Contentions For U.S. Patent Nos. 5,500,872, 5,627,412, 5,946,344, 6,075,807, 6,320,896, And 6,714,559, 2006.

Johnson, "Thoughts on an Adaptive Link Level Protocol." Tucson Amateur Packet Radio Colorado Springs, 1989.

Sidhu et al., "Inside Appletalk", Second Edition, Addison-Wesley Publishing Company, Inc., 1990.

Claim Construction Order for U.S. Patent No. 6,714,559, 2006.
Backes, "Spanning Tree Bridges, Transparent Bridges for Interconnection of IEEE 802 LANS", IEEE Network, vol. 2, No. 1, Jan. 1988.
Huang et al., "Throughput Analysis And Protocol Design For CSMA and BTMA Protocols Under Noisy Environments", IEEE Proceedings-I, vol. 139, No. 3, Jun. 1992.
Johnson, "Thoughts on an Adaptive Link Level Protocol",1989.
Kiesel et al., "A New CSMA-CD Protocol for Local Area Networks with Dynamic Priorities and Low Collision Probability", IEEE Journal on Selected Areas in Communications, vol. SAC-1, No. 5, Nov. 1983.
Kleinrock et al, "Spatial Reuse in Multihop Packet Radio Networks", Proceedings of the IEEE, vol. 75, No. 1, Jan. 1987.
Marsan et al., "Multichannel Local Area Network Protocols", IEEE Journal on Selected Areas in Communications, vol. SAC-1, No. 5, Nov. 1983.
Onunga et al., "Performance Analysis of CSMA with Priority Acknowledgments (CSMA/PA) on Noisy Data Networks with Finite User Population", IEEE Transactions on Communications, vol. 29, No. 7, Jul. 1991.
Pursley, "The Role of Spread Spectrum in Packet Radio Networks", Proceedings of the IEEE, vol. 75, No. 1, Jan. 1987.
Takagi et al., "Throughput Analysis for Persistant CSMA Systems", IEEE Transactions on Communications, vol. Com-33, No. 7, Jul. 1985.
TSAO, "A Local Area Network Architecture Overview, Defining LAN Environments and User Needs", IEEE Communications Magazine vol. 22, No. 8, Aug. 1984.
Yang, Yaling and Kravets, Robin, "Contention-Aware Admission Control for Ad Hoc Networks", IEEE Transactions on Mobile Computing, vol. 4, No. 4, Jul.-Aug. 2005.
Dec. 12, 2005 Case Management Order in Qualcomm Inc. v. Broadcom Corp., 05-cv-1392 B (BLM).

* cited by examiner

REDUNDANT RADIO FREQUENCY NETWORK HAVING A ROAMING TERMINAL COMMUNICATION PROTOCOL

CROSS REFERENCE TO RELATED APPLICATIONS

The present application is a continuation of U.S. application Ser. No. 10/762,746, filed Jan. 22, 2004, now U.S. Pat. No. 7,386,002, which is a continuation of U.S. application Ser. No. 09/960,265, filed Sep. 21, 2001, now U.S. Pat. No. 6,714,559, issued Mar. 30, 2004, which is a continuation of U.S. application Ser. No. 09/849,776, filed May 4, 2001, now abandoned, which is a continuation of U.S. application Ser. No. 09/482,197, filed Jan. 12, 2000, now abandoned, which is a continuation of U.S. application Ser. No. 08/941,496, filed Sep. 30, 1997, now abandoned, which is a continuation of U.S. application Ser. No. 08/270,533, filed Jul. 5, 1994, now U.S. Pat. No. 5,673,031, issued Sep. 30, 1997. Said application Ser. No. 08/270,533 is hereby incorporated herein by reference in its entirety including Appendices A and B.

Said application Ser. No. 08/270,553 is a continuation-in-part of U.S. application Ser. No. 07/802,348, filed Dec. 4, 1991, now abandoned, which is a continuation-in-part of U.S. application Ser. No. 07/790,946, filed Nov. 12, 1991, now abandoned. Said application Ser. No. 07/790,946 is hereby incorporated herein by reference in its entirety.

INCORPORATION BY REFERENCE

Applicant hereby incorporates herein by reference U.S. Ser. No. 07/910,865, filed Jul. 6, 1992 by Mahaney et al.

TECHNICAL FIELD

The present invention relates to a redundant radio frequency (RF) network having a communication protocol for servicing roaming terminals, and more particularly, relates to a redundant communication network having a polling protocol which allows roaming terminals to selectively communicate using spread spectrum RF transmissions with host computers or with other roaming terminals through a network of many available base stations.

BACKGROUND OF THE INVENTION

Radio frequency (RF) communication networks and protocols are known having remote, roaming terminals which communicate through a variety of types of communication links to host computers. Based on the overall spatial layout, response time and loading requirements of the network, different networking schemes and communication protocols have been sought so as to most efficiently regulate the communications.

Particular advantages have been identified in the use of RF communication links such as allowing remote terminals to "roam", free from hardwired cable connections. In basic configurations, a single host computer communicates along some hard-wired link to an RF base station which would maintain an RF communication link to a single roaming terminal. As long as the roaming terminal stays within range of the RF base station and no other roaming terminals are needed, a very simple network configuration and communication protocol can be used. However, when faced with hundreds of roaming terminals which move in and out of the range of multiple RF base stations, networking and protocol problems emerge.

To solve these problems, attempts have been made to decrease the number of base stations by increasing the base stations range; however, the range of the often battery-powered roaming terminals cannot match the increased range of the wall-socket-powered RF base stations. Moreover, by increasing the range, collisions due to propagation times also increase, slowing down the overall communication time.

Other attempts have been made to increase the number-of RF base stations so as to cover the entire roaming area. Although this solves the range problems associated with a single RF base station, additional problems result. First, roaming terminals which are in an overlapping range region between RF base stations communicate with one base station but receive unwanted communication from the other. Second, each roaming terminal often receives unwanted communication from other roaming terminals. Similarly, each roaming terminal often encounters "hidden" communications from other roaming terminals to a common base station. Because of these encounters, each roaming terminal often transmits over the "hidden" communications causing collisions.

Additionally, as the number of RF base stations increase, communication pathways from the source to destination become more and more complex. In a network with fixed spatial locations of base stations, host computers and remote terminals, these communication pathways from a source to a destination can easily be determined. In an environment in which the spatial layout of the network continually changes, however, determining the most efficient pathways becomes very difficult. This is because the most efficient pathway from a source to a destination continually changes due to: 1) the movement of the roaming terminals; 2) the relocation of RF base stations; and 3) the occasional break down of RF base stations and host computers.

Communication networks are also known which are often partially or completely disabled upon the break down of a single element of the network.

It is therefore an object of the present invention to provide a communication protocol between the base stations and roaming terminals for optimizing the utilization of the RF range of each base station.

It is a further object of the present invention to provide an adaptive communication network with inherent redundancy.

It is another object of the present invention to provide a communication protocol for use in a network of host computers, base stations and roaming terminals which is not susceptible to collisions with "hidden" communications.

It is yet another object of the present invention to provide a communication protocol which minimizes collisions in the overlapping regions of different RF base stations.

SUMMARY OF THE INVENTION

These and other objects are achieved in a method of beginning a data exchange over an RF communication link. The sending device initially identifies the fact that the RF communication link is clear during a period at least as long as the maximum interpoll gap. Thereafter, a request for poll frame is transmitted by the sending device.

In addition, these and other objects are achieved in a method used by a remote terminal having an RF range for selectively attaching itself to one of a plurality of RF base stations. Each of these base stations has an associated cost, a preset priority, and a preset number. The remote terminal receives a message from each base station and discards those which fall below a predetermined minimum threshold level.

The remote terminal will attach itself to one of the plurality of base stations based on the cost, signal strength, preset priority, and preset number.

Additionally, these and other objects are achieved in a method for selecting and redundantly replacing a root device when it breaks down from among a plurality of potential root devices. Each of the potential root devices has a single, assigned preset number. The potential root device with the lowest assigned preset number is initially selected. Whenever the selected root device breaks down, one of the potential root devices will be selected based on the lowest assigned preset number without considering the preset number of the currently selected root device.

DESCRIPTION OF THE PREFERRED EMBODIMENT

Figure 1:
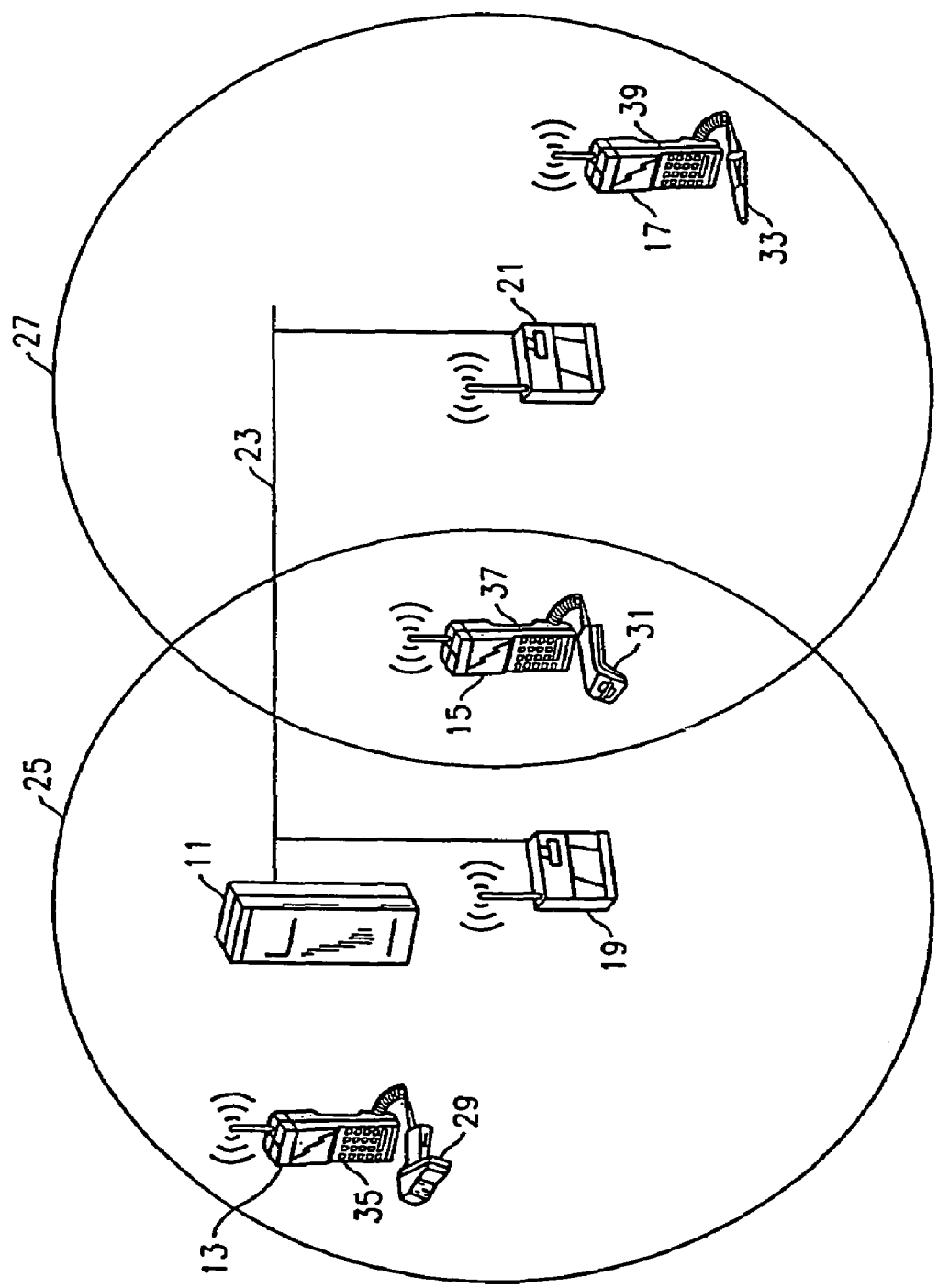
FIG. 1 is a diagram which illustrates the basic communication pathways and spatial relationships between a host computer, base stations and roaming terminals of the present invention.

FIG. 1 is a diagram which illustrates the basic communication pathways and spatial relationships between a host computer, base stations and roaming terminals of the present invention. Particularly, a host computer 11 and roaming terminals 13, 15 and 17 indirectly communicate through base stations 19 and 21. The base stations 19 and 21 receive communications via one link medium and relay those communications along another. Particularly, a "hard-wired" connection such as an IEEE 802.3 (ethernet) interface provides a link 23 to host computer 11, while radio frequency (RF) transmission provides the link to the roaming terminals 13, 15 and 17.

If the remote terminals 13, 15 and 17 are within the RF range of each other, they can use direct RF transmission as the link. If they are not within RF range, an indirect communication link must be found through the base stations 19 and 21. The RF range of the base stations 19 and 21 is illustrated in FIG. 1 by the respective circular boundaries 25 and 27. The boundaries 25 and 27 represent the maximum radial distance from the base stations 19 and 21 that RF communications can be maintained.

In one preferred embodiment, the host computer 11 can be either an IBM AS400 or 3090 mainframe. The base stations 19 and 21 are NORAND RB4000 products and the roaming terminals 15, 17 and 19 are NORAND RT1100 products.

Although only one host computer, two base stations and three roaming terminals are shown for simplicity, the use of additional host units, many more base stations and hundreds of roaming terminals are contemplated. Instead of the "hard-wired" ethernet interface, it is also contemplated that the entire link 23, or any portion thereof, can be maintained using RF transmissions. In such situations, because of the range limitations associated with an RF link, it may be necessary for several base stations to relay communications between the host computer 11 and the roaming terminals 13, 15 and 17. Alternatively stated, the communications "hop" from one base station to the next until the destination is reached.

As the number of base stations increase, the number of possible "hopping" pathways also increases. A backward-learning, spanning tree algorithm is used so as to select the "hopping" pathway with the lowest "cost" to a given destination. A detailed description of this algorithm can be found in co-pending application U.S. Ser. No. 07/769,425, entitled "A RADIO FREQUENCY LOCAL AREA NETWORK" filed Oct. 1, 1991 in the names of Meier et al., which is incorporated herein by reference. Basically, to summarize, a "cost" is assigned to every direct communication link in the network. This "cost" factor takes into account the communication bandwidth of a particular link. Next, the spanning tree algorithm using backward learning identifies the "hopping" pathway of lowest "cost" from any source to any destination. Whenever any direct link is faulty or a "hopping point" (a base station for example) is moved or breaks down, an alternate low "cost" pathway can be used. This provides an inherent redundancy to the network.

Referring back to FIG. 1, roaming terminals 15, 17 and 19 collect data that must be communicated to the host computer 11. This data is collected either via respective bar code readers 29, 31 and 33 or keyboards 35, 37 and 39. U.S. Pat. Nos. 4,910,794; 4,924,462; and 4,940,974 provide a further description of these readers and data collection. The terminals 15, 17 and 19 can also request information from the host computer 11 or from other roaming terminals. Similarly, the host computer 11 may desire to communicate with the roaming terminals 15, 17 and 19 in order to download configuration information, database information or to send commands.

Before communication can be initially established, the roaming terminals 13, 15 and 17 must first listen for hello-messages from the base stations 19 and 21. The base station 19 and 21 both send out hello-messages approximately once every second. The hello-messages identify the sending base station along with its current loading and associated "cost".

The roaming terminals 13, 15 and 17 attempt to detect every possible hello-message from any base station within range. This requires that the hello-message listening period be at least as long as the maximum time between hello-messages sent by any single base station. For example, the terminals 13 and 17 would respectively receive a hello-message from the base stations 19 and 21, while the terminal 15 would receive two hello-messages: one from the base stations 19 and one from the station 21. Only those hello-messages that meet a minimum "signal strength" threshold are further considered. All weaker hello-messages are ignored.

As spatially represented in FIG. 1, upon receiving hello-messages from a single base station, the roaming terminals 13 and 17 can immediately initiate communication with the host computer 11 by "attaching" to their respectively identified base stations 19 and 21. The roaming terminal 15, however, which received two sufficiently strong hello-messages signals, must select either base station 19 or 21 before "attaching".

To make this selection, the roaming terminal 15 must initially consider the "cost". Specifically, terminal 15 must select the base station which has the lowest "cost". If the "costs" are equal, terminal 15 must select the base station whose received hello-message has the highest "signal strength". If the corresponding "signal strengths" also prove to be equal, the roaming terminal 15 selects the base station with the highest user defined "priority". This priority can be preset by the user based on both the spatial layout and the nature of the components being used. Finally, if these factors all prove equal, the terminal 15 merely selects the base station with the lowest "preset number". Each base station is randomly assigned a unique "preset number" upon its manufacture or during its installation onto the network.

Assuming that station 19 and 21 have the same "cost" and "signal strength" but that station 19 has the highest user defined "priority", gravitation in the overlapping region occurs toward the base station 19. In this way, the base station 19 can better regulate communication in the overlapping RF regions with minimal channel contention.

More particularly, the user set "priority" assigned to a base station could also be determined based on the spatial layout of competing base stations. The higher "priority" base stations can be surrounded by lower "priority" base stations and vice versa in a pattern defined by the total area being covered so as to cause as much migration as possible onto the higher "priority" base stations and away from the lower "priority" base stations. similarly, in determining high "priority", consideration can also be given to the base stations ordinarily containing high concentration of roaming terminals.

It is further contemplated that factors which indicate the current load on base stations 19 and 21 could also be considered in the selection by the roaming terminal 15. First, if heavy loading is considered a negative factor, the roaming terminals 13, 15 and 17 that pass within the overlapping region defined by boundaries 25 and 27 would gravitate toward base stations with the lightest load. Although this balances the loading between base stations, it causes greater channel contention problems in the overlapping regions. Second, if heavy loading is considered a positive factor, the roaming terminals would gravitate toward base stations with the heaviest load. In this manner, a heavily loaded base station could better manage communication when surrounded by lightly loaded stations.

As roaming terminals 13, 15 and 17 move within the confines of boundaries 25 and 27, they often need to re-evaluate their base station selection. Instead of waiting until RF communication with their selected base station is entirely lost, the remote terminals 13, 15 and 17 can periodically re-evaluate the "cost" and "signal strength" of either the hello-messages or any other RF transmission sent from other base stations. Upon selecting a new base station, the roaming terminals merely "attach" to their new selection. Furthermore, in addition to or in place of this periodic re-evaluation described in the preferred embodiment, a decline in the selected base station's "signal strength" might also be used as a factor for initiating a re-evaluation.

Figure 2:
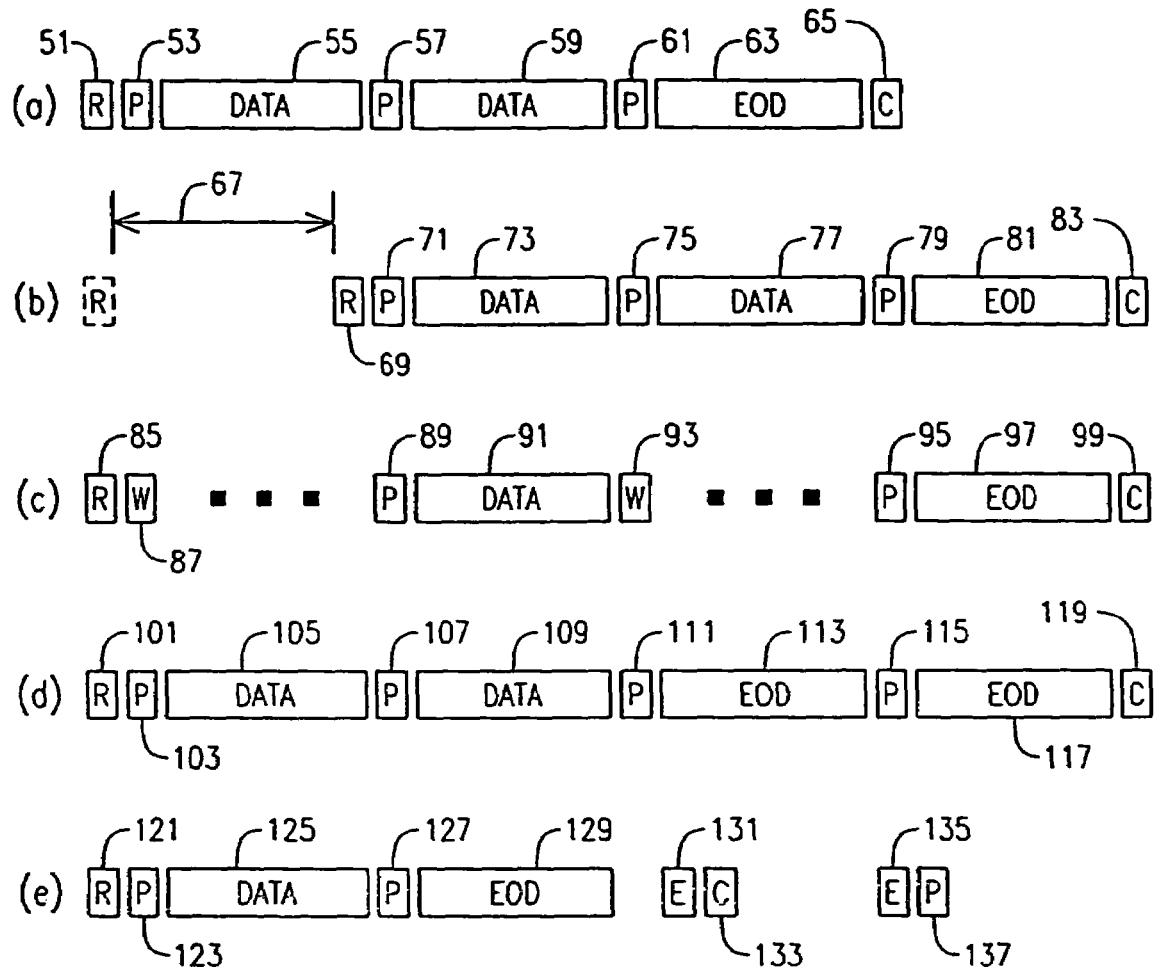
FIG. 2 is a timing diagram illustrating several possible communication exchanges between any base station and roaming terminal of FIG. 1.

FIG. 2 is a timing diagram illustrating several possible communication exchanges between any base station and roaming terminal of FIG. 1. For example, with specific reference to exchange (a), when roaming terminal 13 desires to communicate with the host 11 through the selected base station 19, the terminal 13 merely listens for a clear channel using a standard collision-sense multiple access (CSMA) approach and transmits a request for poll (RFP) frame 51. The base station 19 chooses to immediately respond by transmitting a polling (POLL) frame 53. This POLL frame 53 indicates to the terminal 13 that the channel is currently clear to send data. The terminal 13 sends data in frames of a preset size. If the frame size is smaller than the total block of data to be transmitted, multiple frames must be sent. In exchange (a), for example, three frames of data (DATA frames) 55, 59 and 63 are required to transmit the entire data block.

In response to the POLL frame 53, the terminal 13 sends the first DATA frame 55. A field in each DATA frame is used to indicate either that more DATA frames follow or that the current DATA frame is the last. A DATA frame containing the later indication is called an end of data (EOD) frame. Because the DATA frame 55 is not the EOD frame, the base station 19 expects more data to follow and sends a POLL frame 57. The terminal 13 again responds by sending the DATA frame 59, and again, base station 19 responds with another POLL frame 61. Although not shown, this process can repeat until the EOD frame is encountered. Upon receiving the EOD frame 63, the base station 19 realizes that no further data needs to be transmitted. Instead of sending another POLL frame, the station 19 sends a channel clear (CLEAR) frame 65 and forwards the data toward the host computer 11.

The standard CSMA protocol described in exchange (a) above only requires that the roaming terminal 13 listen long enough to identify an "apparently clear channel" before sending an RFP frame. This does not require that the channel be truly clear, however. To clarify this distinction, although the terminal 13 can easily determine that the base station 19 is not transmitting to the roaming terminal 15, it may be impossible for terminal 13 to determine whether the terminal 15 is transmitting to the base station 19. This impossibility is based on the limited RF range of the roaming terminals 13, 15 and 17. As shown in FIG. 1, because of their separation, the terminal 15 appears "hidden" to the terminal 13. Using the standard CSMA approach, the RFP frames sent out after identifying an "apparently clear channel" collide with "hidden" ongoing communications. During a period of light communication traffic ("lightly loaded conditions") on a given base station, such collisions prove to be statistically infrequent and thus pose no serious problems.

Under heavily loaded conditions, because such collisions prove to be statistically more frequent, a modified CSMA approach is used. This modified approach requires that the roaming terminals identify a "truly clear channel" before transmitting an RFP frame. This is accomplished by extending the up-front listening period of the roaming terminals to be slightly greater than the maximum possible time span between POLL or CLEAR frames (herein designated the "interpoll gap"). Referring specifically to FIG. 1 and exchange (b) in FIG. 2, the terminal 13 listens for an interpoll gap time 67. By listening through the entire interpoll gap time 67, even though the terminal 13 cannot directly identify an ongoing transmission from the "hidden" terminal 15 to the base station 19, the terminal 13 indirectly concludes that such a communication has not taken place. This conclusion is based on the failure to receive a POLL or CLEAR frame directed to the "hidden" terminal 15 from the base station 19. Had such a POLL or CLEAR frame been received during the interpoll gap time 67, the terminal 13 would have concluded that a "hidden" communication had been ongoing. Thus, the terminal 13 would transmit an RFP frame only after a CLEAR frame was received.

Upon identifying a "truly clear channel", the communication exchange (b) is identical to that of exchange (a) described above. To summarize, the terminal 13 sends an RFP frame and base station 19 responds with POLL frames 71, 75 and 79 which respectively initiate DATA frames 73 and 77 and an EOD frame 81. Upon receiving the EOD frame 81, the base station 19 sends a CLEAR frame 83 and enters a dormant, listening state.

Based on the communication traffic, the base stations 19 and 21 determine individually whether they are lightly or heavily loaded. Although this loading status is transmitted to the remote terminals in a reserved field of each hello-message, it is contemplated that this reserved field might also be placed within every POLL and CLEAR frame. Upon receiving the loading status, the roaming terminals 13, 15 and 17 can appropriately choose either the standard or modified CSMA listening period protocol.

Although in exchanges (a) and (b) the base station 19 responded immediately to the roaming terminal 13 with POLL frames, this need not be the case. In fact, the base station 19 may decide to service the remote terminal 13 at some other time. Exchange (c) demonstrates this control. As shown, the terminal 13 sends an RFP frame 85. In response, the base station 19 decides to send a wait for poll (WFP) frame 87. This informs the terminal 13 that the base station 19 received the RFP frame 85 and will poll at some later time, The terminal 13 thereafter remains silent, awaiting a POLL frame 89. When the base station 19 sends the POLL frame 89, the terminal 13 responds by transmitting a DATA frame 91. This is not an EOD frame therefore even though another POLL frame could be sent to retrieve the remaining DATA frames, the base station 19 decides to send another WFP frame 93. Again terminal 13 waits. At some time later, the base station 19 continues the data transfer by sending a POLL frame 95. The terminal 13 immediately responds with an EOD frame 97. Finally, the base station 19 sends a CLEAR frame signifying the channel is clear.

Exchange (d) illustrates the circumstance involving an incorrectly received DATA frame. Specifically, after sending an RFP frame 101 and receiving a POLL frame 103, the roaming terminal 13 attempts to send a first data frame during a time period 105 to the base station 19. This first data frame is not correctly received so base station 19 responds by sending a POLL frame 107 which requests that the previously sent data frame be repeated. The terminal 13 responds by resending the first data frame during a time period 109. This time, the base station 19 properly receives the first data frame and sends a POLL frame 111 requesting the next DATA frame. The terminal 13 responds by attempting to send the last DATA frame, the EOD frame, during a time period 113. The base station 19 responds to the incorrect reception by sending a further POLL frame 115. The terminal 13 resends the EOD frame during time period 117 which is properly received by the base station 19 and a CLEAR frame 119 completes the communication exchange.

In exchange (e), after a successful exchange sequence of an RFP frame 121, a POLL frame 123, a DATA frame 125 and a POLL frame 127, communications break down. The terminal 13 responds to the POLL frame 127 by sending an EOD frame 129 but receives no responsive CLEAR frame. Either the EOD frame 129 was not received and a POLL frame requesting a resend was lost, or the EOD frame 129 was correctly received and a CLEAR frame was lost. To determine which, the terminal 13 sends an enquiry frame (ENQ) 131 to the base station 13. The base station 19 responds by sending a CLEAR frame during time period 133 indicating that a previously sent CLEAR frame must have been lost. Alternatively, if no response is detected in time period 133, the terminal 13 resends an ENQ frame 135. The base station 19 responds in a time period 137 with a POLL or WFP frame signifying that the EOD frame 129 has been lost.

The description of the communication protocol from the roaming terminals 13, 15 and 17 and base stations 19 and 20 relating to FIG. 2 above applies equally to communications in the reverse direction. Similarly, communications from the base stations 19 and 20 toward the host computer 11 are also governed by this protocol. One difference exists, however. For the portions of link 23 which are hard wired (such as an ethernet interface), the segmentation of data into fixed frames is not needed. Therefore, after receiving a series of data frames (hereinafter called a "bracket of frames"), the base stations 19 and 20 will recombine the data into one complete block for transmission along hardwired portions of link 23.

Figure 3:
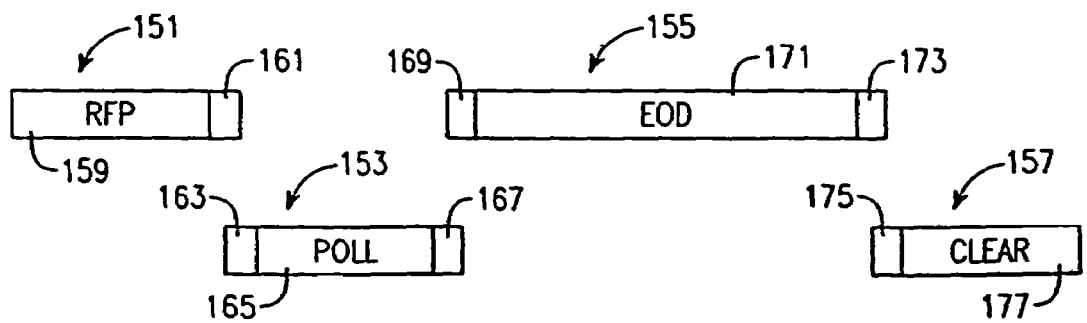
FIG. 3 is a detailed view of a portion of the timing diagram shown in FIG. 2 which illustrates the interframe gap blocking function.

FIG. 3 is a detailed view of a portion of the timing diagram shown in FIG. 2 which illustrates the interframe gap blocking function. Specifically, if the roaming terminal 13 desires communication with the selected base station 19, the terminal 13 initiates communication by transmitting an RFP frame 151. Prior to the completion of this transmission, the base station 19 responds by transmitting a POLL frame 153. In turn, prior to the completion of this transmission, the terminal 13 begins transmitting an EOD frame 155. Similarly, prior to full receipt of this EOD frame 155, the base station 19 sends a CLEAR frame 157. In this manner, the channel will remain "busy" during the entire communication exchange. Thus, during lightly loaded conditions, when the roaming terminals 15 and 17 are within RF range of such an exchange, they will not be able to find a "apparently clear channel" and therefore will not cause collisions by sending untimely RFP frames.

More specifically, the RFP frame 151 is further divided into information fields 159 and end of frame fields 161. The POLL frame 153 is divided into beginning of frame fields 163, information fields 165 and end of frame fields 167. Similarly, the EOD frame 155 is further divided into beginning of frame fields 169, information fields 171 and end of frame fields 173. Finally, the CLEAR frame is divided into beginning of frame fields 175 and information fields 177. These overlapping end of frame and beginning of frame fields "block" the channel from being misinterpreted as being "clear".

For example, the terminal 13 begins to transmit the RFP frame 151 to the base station 19. As soon as the beginning of the field 161 is detected, the base station 19 immediately responds with the field 163 of the POLL frame 153. It does not matter that fields 161 and 163 overlap because they carry no other information than to ensure that the channel will be "blocked". The interaction of fields 161 and 163 applies equally to the overlapping fields 167 and 169 and fields 173 and 175.

Figure 4:
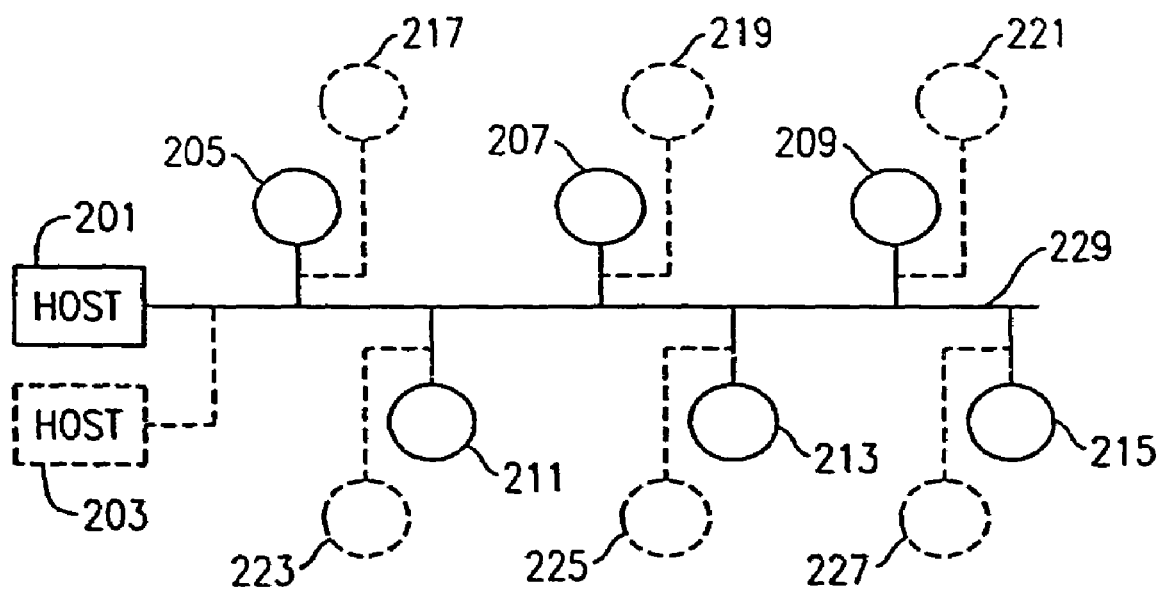
FIG. 4 is a block diagram of a redundant communication interface between several base stations and host computers of the present invention.
Figure 5:
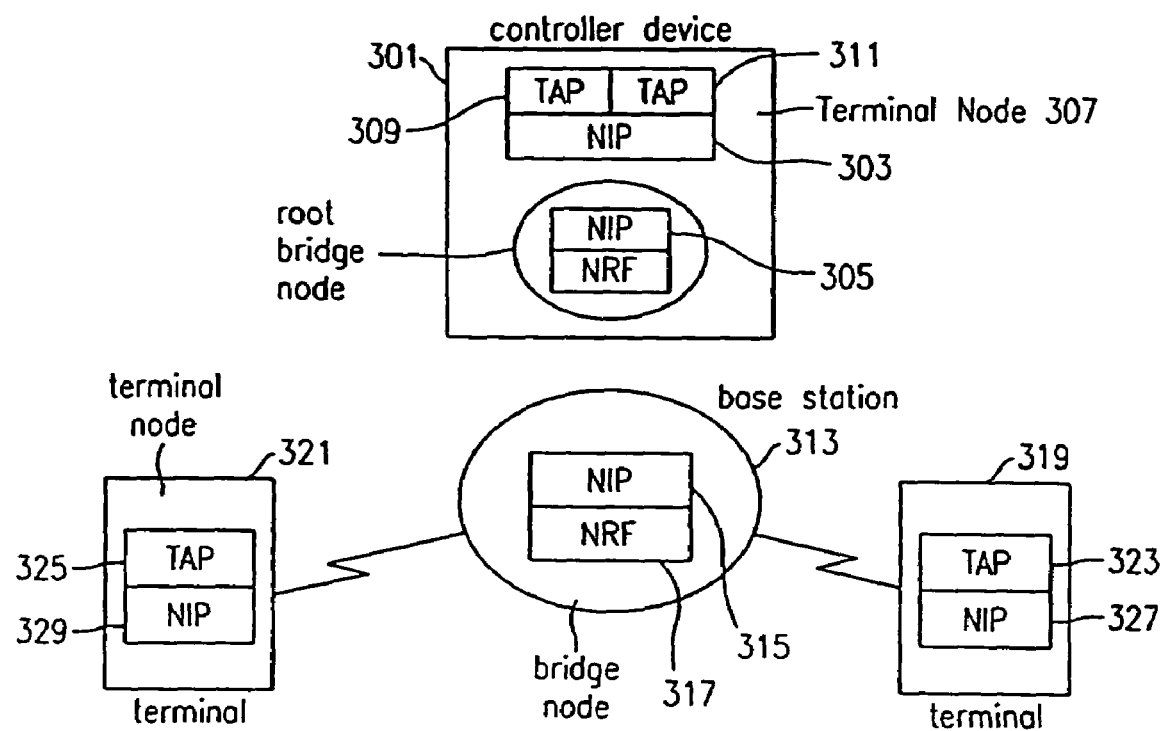
FIG. 5 illustrates the relationship between devices, nodes, terminal access points (TAP), network interface points (NIP) and network routing functions (NRF).
Figure 6:
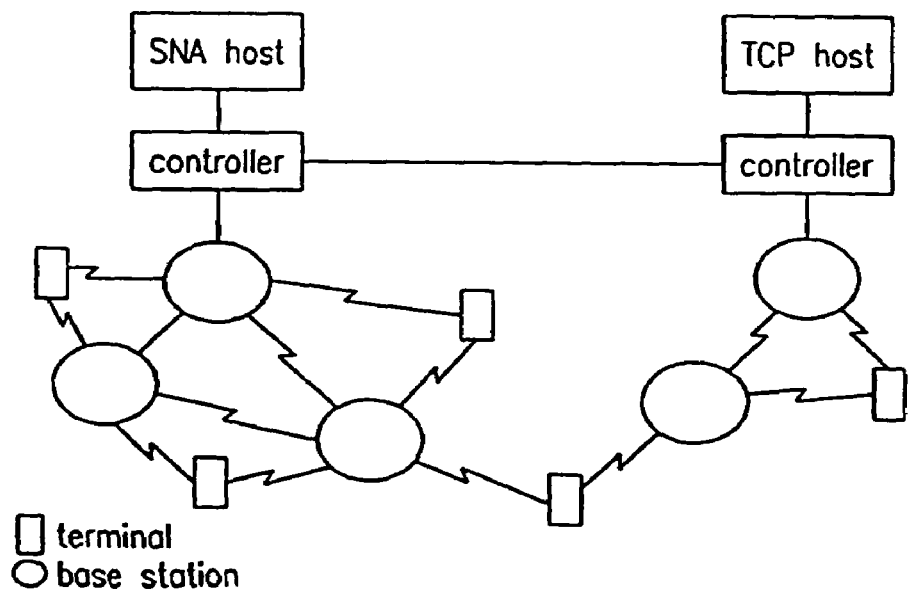
FIGS. 6 and 7 illustrate how physical devices are organized into logical nodes in a spanning tree.
Figure 7:
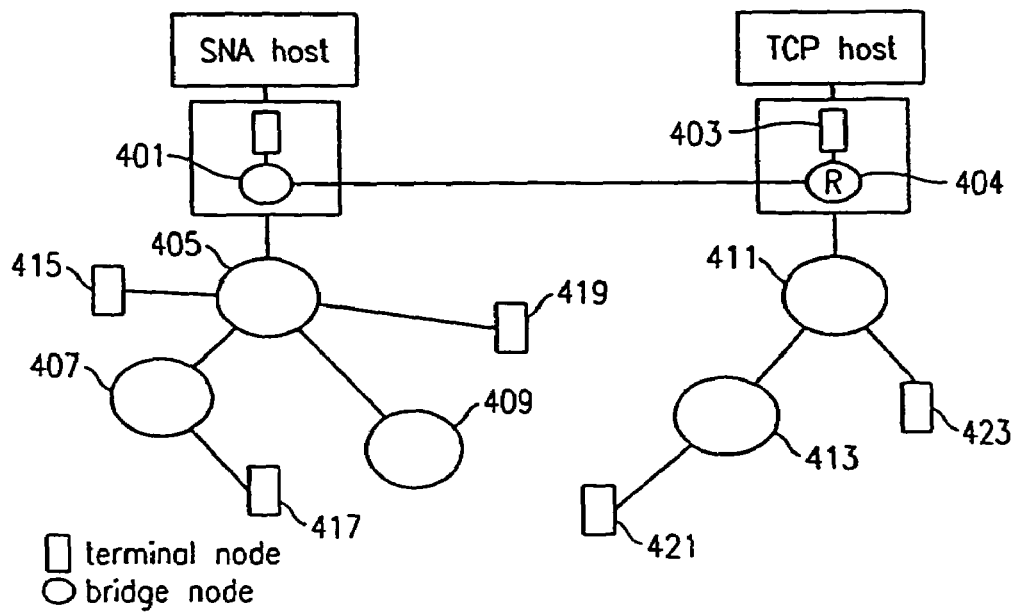

FIG. 4 is a block diagram of a redundant communication interface between several base stations and host computers of the present invention. In this embodiment, a host computer 201 is redundantly backed-up by a dormant host computer 203. If the host computer 201 fails, the dormant host computer 203 which monitors the host computer 201 identifies the failure and takes over. Similarly, base stations 205, 207, 209, 211, 213 and 215 are redundantly backed-up by dormant base stations 217, 219, 221, 223, 225 and 227, respectively. A communication link 229 which may consist in whole or in part of a hard-wired or RF link provides the communication pathway between these host computers and base stations. FIG. 7 depicts the same devices organized as nodes on branches of a spanning tree.

Also providing redundancy, the "root" base station, as defined by the spanning tree, is selected by the "preselect number" (described in reference to the attaching criterion related to FIG. 1 above). The non-dormant base station with the highest "preselected number" is initially designated to be the spanning tree "root". If that base station subsequently fails, either the corresponding dormant base station can take over the full functionality of the "root", or the non-dormant base station with the next highest "preselected number" can be designated as the new "root". In this manner, spanning tree redundancy is maintained.

In an alternate preferred embodiment, an SST (Spread Spectrum Terminal) network is used implements a hierarchical radio frequency network of, potentially roaming terminals used primarily for online data entry and occasionally for batch file transfers. The network is characterized by sporadic data traffic over multiple-hop data paths consisting of RS485 or ethernet wired links and single-channel direct-sequenced, spread-spectrum radio links. The network architecture is complicated by moving nodes, hidden nodes, sleeping nodes, transient radio links, and unidirectional radio links.

The SST network consists of the following types of devices: 1) hosts; 2) controllers; 3) base stations; and 4) terminals. A "host" or host computer, communicates with terminals in the SST network. A "controller" is a gateway which passes messages between the host and the terminals. A "base station" device is used as an interior node for extending the range of a controller. Base-station-to-controller or base-station-to-base-station links can be maintained either with hard-wired or radio communication. A "terminal" i.e., a Norand hand-held computer, printer, etc., interfaces through the SST network to the host via interior nodes.

The terminals, controllers, hosts and base stations are logically organized as nodes in an optimal spanning tree with a controller as the root node, internal nodes in base stations or other controllers on branches of the tree, and terminal nodes as possibly roaming leaves on the tree. With the exception of the root node, each child node is connected by a single logical link to a parent node. Like a sink tree, nodes closer to the root of the spanning tree are said to be "downstream" from nodes which are further away. Conversely, all nodes are "upstream" from the root. Packets are only sent along branches (i.e., logical links) of the spanning tree. Nodes in the network use a "backward learning" technique to route packets along branches of a spanning tree.

Devices in spanning tree are logically categorized as one of the following three node types: 1) roots; 2) bridges; or 3) terminals. A "root" is a controller device which functions as the root bridge of the network spanning tree. The spanning tree has a single root node. Initially, all controllers are root candidates. One and only one root node is determined for each autonomous network by using a priority-based root selection algorithm.

A "bridge" is an internal node in the spanning tree which is used to "bridge" terminal nodes together into an interconnected network. The root node is a bridge, and the term "bridge" may be used to refer to all non-terminal nodes or all non-terminal nodes except the root depending on the context. A bridge node consists of a network interface point and a routing function.

A "terminal" is a leaf node in the spanning tree. A terminal node can be viewed as the software entity that terminates a branch in the spanning tree. A terminal node consists of a network interface point and one or more terminal access points.

A controller device contains a terminal node(s) and a bridge node. The bridge node is the root node if the controller is functioning as the root bridge. A base station contains a bridge node. A base station does not contain a terminal node; a terminal device contains a terminal node. Additionally, a bridging entity refers to a bridge node or to the network interface point in a terminal device.

Network interface points are single network addressable entities which must exist in all nodes. A network interface point is equivalent to the software entity which is used to interface the SST network to a device or bridging node. Note that a controller device connected to a host computer a network interface point which references the host computer and a second discrete network interface point which references the bridging node in the controller. Each network interface point is identified by a unique network address. Unless otherwise specified, this document uses "network address" or simply "address" to refer to the identifier of a network interface point. Moreover, multiple network interface points may be referenced with multicast and broadcast addresses.

Terminal access point refers to a higher layer access point into the network. A terminal access point is defined by the concatenation of the network interface point address and the terminal access point identifier. A terminal device or controller device can have multiple terminal access points.

A logical port is defined by a physical port and a network interface point. This implies that a single device may have more than one physical port with the same network address. In this document "port" refers to a logical port.

A controller device 301 has two NIP's 303 and 305. As an example, the NIP 303 in a controller's terminal node 307 is equivalent to the software entity which interfaces to a host computer. Two TAP's 309 and 317 attached to that NIP identify discrete applications (i.e., terminal emulation and file transfer applications directed to the host computer). A base station 313 has a NIP 315 and a NRF 317, while terminals 319 and 321 have TAP's 323 and 325 and NIP's 327 and 329.

This network environment involves the following characterization features: 1) wired or wireless node connections; 2) network layer transparency; 3) dynamic/automatic network routing configuration; 4) terminals can move about the radio network without losing a data link connection; 5) ability to accommodate sleeping terminals; 6) ability to locate terminals quickly; 7) built-in redundancy; and 8) physical link independence (i.e., higher layer protocols must be consistent across heterogeneous physical links).

This SST network is functionally layered with a MAC (Medium Access Control) layer, bridging layer, data link or transport layer, and higher layers. The MAC layer is responsible for providing reliable transmission between ports on any two devices in the network (i.e. terminal-to-base station). The MAC has a channel access control component and a link control component. The two components are equivalent to the TSO media access control and data link control sublayers, respectively. The link control component facilitates reliable point-to-point frame transfers in the absence of collision detection and in the presence of errors.

A polling protocol is used to restrict contention to request-for-poll (RFP) frames thus minimizing contention for data frames. This protocol uses several channel access control algorithms to regulate access to the communications channel. The algorithms are link-type dependent and incorporate a random backoff algorithm to prevent deadlock and instability in contention situations. Specifically, a p-persistent CSMA/CA (carrier sense multiple access with collision avoidance) protocol is used to gain access to an RS485 LAN. The collision avoidance scheme gives channel access priority to the recipient of a unicast frame. On lightly loaded spread spectrum radio links, a non-persistent CSMA algorithm is used to gain access to the communications channel. Under moderate to heavy channel utilization, an LBT/BP (listen-before-talk with busy pulse) algorithm is used to gain access to the channel and minimize the effect of hidden nodes.

This bridging layer routes packets from terminals to the host, from the host to terminals, and from terminals to terminals along branches of the spanning tree. To accomplish this, the bridging layer uses a "HELLO protocol" to organize nodes in the network into an optimal spanning tree rooted at the root bridge. The spanning tree is used to prevent loops in the topology. Interior branches of the spanning tree are relatively stable. (i.e. controllers and relay stations do not move often). Terminals, which are leaves on the spanning tree, become unattached and must be reattached, frequently. Additionally, the bridging layer also: 1) maintains spanning tree links; 2) propagates lost node information throughout the spanning tree; 3) distributes network interface addresses. 4) organizes nodes into logical coverage areas on radio channels; and 5) The bridging layer provides a service for storing packets for SLEEPING terminals. Packets which cannot be delivered immediately can be saved by the bridging entity in a parent node for one or more HELLO times.

The data-link layer provides an end-to-end data path between data-link access points in any two nodes in the network. The data-link layer provides a connection-oriented reliable service and a connectionless unreliable service. The reliable service detects and discards duplicate packets and retransmits lost packets. The unreliable service provides a datagram facility for upper layer protocols which prove a reliable end to end data path. This layer provides services (ISO layer 2) for terminal-to-host application sessions which run on top of an end-to-end terminal-to-host transport protocol. However, the data-link layer provides transport (ISO layer 4) services for sessions contained within the SST network.

For terminal-to-terminal sessions contained within the SST network, the data-link layer provides transport layer services and no additional network or transport layer is required. In this case, the MAC, bridging, and data-link layers discussed above can be viewed as a data-link layer, a network layer, and a transport layer, respectively. For terminal-to-host-application sessions, higher ISO layers exist on top of the SST data-link layer and must be implemented in the terminal and host computer as required.

MAC frames contain a hop destination and hop source address in the MAC header. Bridging packets contain an end-to-end destination and source address in the bridging header. Data-link headers contain source and destination access point identifiers. A data-link connection is defined by the concatenation of the bridging layer source and destination address pairs and the destination and source data-link access points. One end of a connection is equivalent to a terminal access point and is specified as <access_point>@<network_address>, where aliases can be used for both. MAC and bridging addresses are consistent and have the same format.

All devices must have either a unique long identifier which is programmed into the device at the factory and/or an alias which is entered by the user or is well-known. The long address/alias is only used to obtain a short network address from the root node. A network address uniquely identifies the network interface point in each node. This network address is obtained from an address server in the root. The network interface point passes the network address to the MAC entity attached to each port on a device. Short addresses are used to minimize packet sizes.

A network address consists of a node type and a unique multicast, or broadcast node identifier. A node type identifier of all 1's is used to specify all node types while all 0's specifies a root address. Particularly, node identifier of all 1's is the default node identifier used until a unique node identifier is obtained.

In addition to source and destination addresses, each network packet contains a spanning tree identifier in the MAC header. A default spanning tree identifier is well-known by all nodes. A non-default spanning tree identifier can be entered into the root node (i.e., by a network administrator) and advertised to all other nodes in HELLO packets. The list of non-default spanning trees to which other nodes can attach must be entered into each node. A global spanning tree identifier is also well-known by all nodes, and is reserved for the identify of a spanning tree to which all nodes can attach.

The network node identifier of a root node is always all 0's and is well-known. All other nodes must obtain a unique network node identifier from a (RARP) Reverse Address Resolution Protocol server in the root node. A node identifier of all 1's is used until a unique identifier is obtained. To get a unique identifier, a node must send a RARP request packet to the RARP server. This packet contains the requesting node's unique long identifier and/or an alias for the long identifier. A network address is returned to the requesting node in a RARP response packet.

Nodes must obtain a new network address whenever a new root node is discovered and whenever an ADDRESS-TIMEOUT inactivity period expires without the node receiving a packet from the bridging entity in the root. A node can prevent its address from expiring by sending an empty ATTACH.request packet to the root.

The address server in the root associates an age factor with each allocated network address. The age factor is incremented each time an ADDRESS-TIMER expires. The age factor is reset to zero ("0") whenever the address is used. An address is available for use by a requesting node if it has never been used or if it has been inactive for a MAX-ADDRESS-LIFE timer period. MAX-ADDRESS-LIFE must be larger than ADDRESS-TIMEOUT to ensure that an address is not in use by any node when it becomes available for another node. If the root receives a RARP.request packet from a source for which an entry exists in the address queue, the root simply resets the age factor to zero and returns the old address.

More specifically, the bridging layer organizes nodes into an optimal spanning tree with a single root bridge at the root of the tree. The spanning tree identifier allows more than one logical tree to exist in the same coverage area. Spanning tree organization is facilitated with a HELLO protocol which selects a root node and enables nodes to determine the shortest path to the root before attaching to the spanning tree. All messages are routed along branches of the spanning tree. Restricting each node to a single parent guarantees that there will be no loops in the logical topology.

Nodes in the network are generally categorized as "attached" or "unattached". Initially, only the root is attached. A single controller may be designated as the root or multiple root candidates (other controllers) may negotiate to determine which node is the root.

Attached bridge nodes are root candidates transmit HELLO packets at calculated intervals. The HELLO packets include:

1) the source address;
2) a broadcast destination address;
3) the distance (cost) to the root;
4) a "seed" value used to calculate the time of the next HELLO packet;

5) a hello slot displacement which specifies the displacement of the actual hello slot time from the calculated hello slot time or to indicate that the hello time was not calculated (i.e. was unscheduled);

6) a spanning tree identifier (LAN ID);

7) the priority of the root node (or root candidate);

8) the long, unique device identifier of the root node (or root candidate);

9) descendent count (optional);

10) a pending message list (optional); and 11) a detached-node list.

When desirable, terminals may discontinue its monitoring of the communication channel by going to sleep. Pending messages for these SLEEPING terminals are stored in lists in the parent node which include the network address for accessing the listed SLEEPING terminals.

Detached-node lists are also maintained to enable the spanning tree algorithms. These lists contain the addresses of nodes which have detached from the spanning tree. Each internal node learns which entries should be in its detached-node list from DETACH packets which are broadcast by internal nodes when a child is lost. Entries are also included in HELLO packets for DETACH-MSG-LIFE hello times.

Attached nodes broadcast short HELLO packets immediately if they receive an ATTACH.request packet with a global destination address; otherwise, attached nodes only broadcast HELLO packets at calculated time intervals in "HELLO-slots". Short HELLO packets do not contain a pending-message, long-root identifier, or a detached-node list. Short HELLO packets are set independently of regular HELLO packets and do not affect regular hello timing. The end-to-end ATTACH.request functions as a discovery packet, and enabling nodes in the path to the root node to quickly learn the address of the source node.

Unattached nodes (nodes without a parent in the spanning tree) are initially in an UNATTACHED state. During the UNATTACHED state, a node learns which attached bridge is closest to the root node by listening to HELLO packets. After the learning period expires an unattached node sends: an ATTACH.request packet to the attached node closest to the root. However, nodes without a network address must first send a RARP.request packet to the root to obtain a network address. The attached node adopts the unattached node as a child by acknowledging the ATTACH.request packet and forwarding it on to the root node. The root node returns the request as an end-to-end ATTACH.confirm packet if a response packet required (RPRQ) flag is set. If the newly attached node is a bridge, it calculates its distance to the root, by adding its link distance to the total distance of its new parent, and begins to transmit HELLO packets.

The UNATTACHED learning state ends after HELLO-RETRY hello time slots if HELLO packets have been received from at least one node. If no HELLO packets have been received the listening node waits (i.e. sleeps) and retries later.

An attached node may respond to a HELLO packet from a node other than its parent (i.e. with an ATTACH.request packet) if the difference in the hop count specified in the HELLO packet exceeds a CHANGE-THRESHOLD level. Only attached bridges or the root may respond to an ATTACH.request packet. Unattached nodes may broadcast a global ATTACH.request with a multicast bridge destination address to solicit short HELLO packets from attached bridges. The net effect is that the UNATTACHED state may optionally be shortened. Normally, this facility is reserved for terminals with transactions in progress.

ATTACH.request packets contain a "count" field which indicates that a terminal (i.e. which sent the request) may be SLEEPING. The bridging entity in the parent of a STEEPING terminal can temporarily store messages for later delivery. If the count field is non-zero, the bridging entity in a parent node stores pending messages until the message is delivered, or the "count" hello times have expired. ATTACH.request packets may also contain a decedents list so that an internal node may attach itself and the subtree under it (i.e., to a bridge node closer to the root). In addition, data-link layer data can be piggy-backed on an ATTACH.request packet from a terminal Attached notes forget their network address and return to the UNATTACHED state whenever a HELLO packet is received with a new root node identifier.

The incremental portion of the distance between a node and its parent is primarily a function of the physical link type (i.e. ethernet, RS485, or radio communication). On radio communication links, bridging connections are biased toward the link with the best signal strength. Signal strength is not a factor in the cumulative path distance. The distance component is intended to bias path selection toward high-speed (i.e. wired) connections. On wired links, the weighted distance is the only criteria for choosing a parent.

Specifically, on radio links, a parent is chosen based on the following criteria: 1) the signal strength must exceed a minimum threshold value; 2) if two potential parent nodes are at a different distance from the root, the one with the least distance is chosen; 3) if two potential parent nodes are at the same distance, the node with the best signal strength is chosen; and 4) if two potential parent nodes are at the same distance and have the same signal strength, then the node with the lowest address is chosen. The intent of the above criteria is to create stable disjoint logical coverage areas in the presence of physically overlapping coverage areas. Ideally, all radio terminals in a coverage area will be attached to a single bridge node.

The concept of disjoint logical coverage areas is especially important when radio bridge nodes are placed in close proximity to provide redundant coverage for protection against a failure. The MAC entity in one of the bridge nodes can efficiently regulate access to the channel by queuing terminals for polling without coordination with other co-located bridge nodes.

All packets are routed along branches of the spanning tree. Bridges "learn" the address of terminals by monitoring traffic from terminals to the root. When a bridge receives a packet directed toward the root, the bridge creates or updates an entry in its routing table for the terminal. The entry includes the terminal address and the bridge address which sent the packet. The latter address is called the hop source address. When a bridge receives an upstream packet moving from the root toward a terminal the packet is forwarded to the upstream node which is specified in the routing entry for the destination.

Upstream packets are discarded whenever a routing entry does not exist. Downstream packets are simply forwarded to the next downstream node in the branch of the spanning tree. No explicit routing is required for downstream traffic because the route is defined by the structure of the spanning tree. A packet travels downstream until a node is reached which has an entry in its routing table for the destination address. The packet is then explicitly accomplished by routing all traffic through the nearest common ancestor of both terminals. In the worst case, the root is the nearest common ancestor. Additionally, an address resolution server in the root node facilitates terminal-to-terminal communications.

Referring back to the exemplary configuration shown in FIG. 7, if a terminal 417 sends a packet to a terminal 403, the packet follows the downstream hops from the terminal 417 through a base station 407, through a base station 405, to a node, 401 and to a root node 404. Routing tables are not required for the downstream hops. The routing function at the root node 404 has an entry for the terminal 403 in its routing table which specifies the terminal 403 as the first upstream hop to terminal 403. Therefore, the packet is explicitly routed upstream to the terminal 403.

As a second example, if terminal 419 sends a packet to terminal 417, the packet follows one downstream hop from the terminal 419 to the base station 405. The routing function at the base 405 has an entry for the terminal 417 in its routing table which specifies the base 407 as the first upstream hop to the terminal 407. The packet is routed upstream to the base 407. An entry in the routing table at the base 407 specifies the terminal 417 as the first upstream hop to the terminal 417, and the packet is thus routed.

As an extension to the routing algorithm described above, terminals may optionally cache the addresses of neighbors in a separate direct route table. If a terminal has a message for a destination listed in its direct route table, it may transmit it directly to the source node. Note that the packet may not follow a branch of the spanning tree. Direct-route table entries are "aged" relatively quickly. If a direct transmission fails, the entry in the direct-route table is discarded and the packet is simply forwarded downstream to the root. The header format filed in the bridge header must be set to point-to-point for directly transmitted packets. Direct routing has obvious advantages; however, it forces terminals to maintain additional MAC layer state information.

Figure 8:
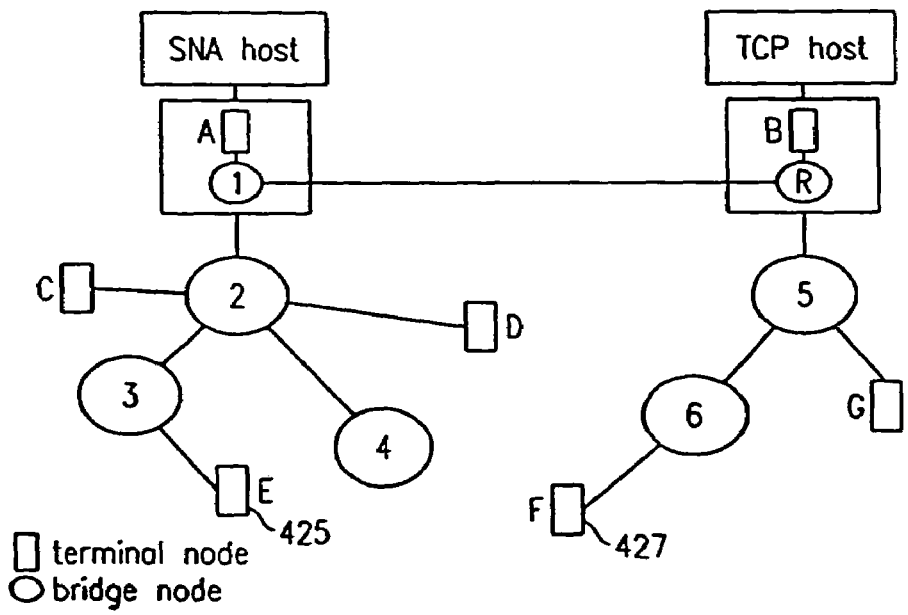
FIG. 8 illustrates one example of direct routing used in the preferred embodiment.

As an example of direct routing, in FIG. 8, a terminal 425 can route packets directly to a terminal 427, if the terminal 425 has an entry for the terminal 427 in its direct routing table. The direct routing table in a node is built by listening to traffic directed to other nodes. If the MAC layer screens such traffic from the bridging layer, the direct routing table must be built by the MAC layer.

Paths in the spanning tree can change for a number of reasons. First, any node may select a new path to the root if the distance of its parent from the root is CHANGE-THRESHOLD greater than the distance in a HELLO packet from another node where CHANGE_THRESHOLD can be as small as one ("1"). A node on a radio channel should always choose for its parent the node with the best signal strength, and, all else being equal, the node with the lowest address. A node can move its entire subtree by including a decedents list in the ATTACH.request packet sent to the new parent. Rapidly moving terminals can also cache a short list of alternate parents. Periodically, SLEEPING terminals stay awake for at least one full HELLO to HELLO period to discover changes in the network topology.

Second, a parent node detaches the subtree rooted at a child node whenever a message cannot be delivered to the child. This occurs when the MAC layer in a parent node fails to deliver a unicast bridging layer packet to a child node. In addition, the bridging entity in a parent node can retain messages for a child terminal node. Terminals request the save messages by sending a DATA-REQUEST.request packet to the parent. If the message is not requested and delivered after a pre-determined number of HELLO periods, the terminal is detached. If the detached node is a bridging node, the parent node sends a DETACH.request packet to the root node which contains a decedents list that defines the lost subtree. If the detached child is a terminal, the parent floods a DETACH.request throughout all branches of the spanning tree using a reliable broadcast mechanism. The detached node information which is broadcast in flooded DETACH.request packets is added to the detached-node-set maintained in each bridge node. Each entry in the set has a HELLO-count associated with it. If an entry in the detached node list of a DETACH.request packet already exists in a bridge's detached-node-set, the associated HELLO-count filed is reset to zero ("0"). The detached-node-set is copied into the detached-node-list in the bridge's HELLO packets. The HELLO-count field for each entry is incremented after each HELLO is transmitted. Entries whose hello-count field exceeds a predetermined HELLO-value are deleted.

Third, a child node goes into state whenever its MAC layer fails to deliver a message to its parent. If the child node is a bridge, it continues to broadcast scheduled HELLO packets with an infinite distance for a time greater than that defined by the HELLO-value (HELLO-retry+1 time). If the child node is a terminal, it may solicit short HELLO packets to shorten the UNATTACHED state. The UNATTACHED learning state has expired the node reattaches by transmitting an ATTACH.request to the bridge node closest to the root.

Fourth, if a node in an ATTACHED state receives a DETACH packet or a HELLO packet with its network address in the detached-node-list, it must enter the UNATTACHED state and reattach to the spanning tree. Additionally, a node can shorten the UNATTACHED state by soliciting short HELLO packets. After reattaching, the node must remain in a HOLD-DOWN state for HELLO+1 time. During the HOLD-DOWN state, the node ignores its address in DETACH packet and HELLO packet detached-node-lists. After the HOLD-DOWN period expires, the node sends a second ATTACH.request to the root to ensure that it is still attached.

Fifth, entries in routing tables are aged. When routing table space for a new entry is required, either an unused entry or the oldest (i.e. least recently used) entry is selected. If a used entry is selected, the old information is simply discarded. The aging factor associated with each table entry is reset to zero ("0") each time a new packet from the associated node arrives. In the absence of a regular data traffic, a node must periodically send an ATTACH.request packet to the root node to maintain its path in the spanning tree.

Sixth, a node enters the ATTACHED-LISTEN state whenever two HELLO packets from its parent are missed. SLEEPING terminals remain awake during the ATTACHED LISTEN state. This state ends when the node receives a data or HELLO packet from its parent. The node enters the UNATTACHED state when either its address appears in the detached list if a DETACH or HELLO packet or a total of HELLO-RETRY−1 consecutive HELLO packets are missed. The time that a node spends in the ATTACHED-LISTEN state is less than the lifetime of detached node information in the network. This ensures that a detached node always enter the UNATTACHED state since either the node finds its address in a detached-node-list or misses HELLO-RETRY−1 HELLO packets and goes into the UNATTACHED state before it sees a "good" HELLO packet from its parent.

Lastly, any node which receives a HELLO packet from its parent with an infinite distance immediately enters the UNATTACHED state. If the node is a bridge, it must continue to broadcast HELLO packets with an infinite distance for HELLO-times.

Old invalid paths may exist in the spanning tree for a period of time. For example, if a terminal detaches and reattaches to a different branch in the spanning tree, all downstream nodes in the new branch "learn" the new path to the terminal. Nodes which were also in the old path change their routing tables and no longer forward packets along the old path. At least one node, the root, must be in both the old and new path. A new path is established as soon as an end-to-end attached request packet from the terminal reaches a node which was also in the old path. Any remaining old path fragment is disjoint from the new path.

A parent node generates a DETACH.request packet whenever it is unable to deliver a message to a child node. When a parent node is unable to deliver a message to a child bridge node, it sends a DETACH.request packet, to the root node, which contains a detached-node-list describing the lost subtree. The list contains all nodes in the routing table of the parent for which the lost bridge was the first upstream hop. All downstream nodes in the path of the DETACH packet must adjust their routing tables by deleting entries which match those in the detached-node-list.

When a parent node is unable to deliver a message to a terminal, it must generate a DETACH.request packet with the terminal specified in the associated detached-node-list and flood the packet throughout all branches of the spanning tree. This packet is forwarded using a reliable broadcast mechanism. In response a DETACH packet is issued which contains a forward list to specify which nodes should forward and acknowledge the DETACH.request. Initially, the forward list consists of all bridges which are either children or the parent of the node which generated the packet. Nodes in the forward list acknowledge the DETACH.request with a DETACH-.response and forward the DETACH.request along all branches of the spanning tree except the branch it was received on, but with one exception. A bridge node in the forward list does not forward an entry in the detached list of a DETACH.request if the DETACH.request came from an upstream node and the upstream node is not the first hop in the routing table entry associated with the entry in the detached-node-list. Upstream bridges which do not have bridge nodes as children broadcast the DETACH.request one time without a forward list.

The destination address used to forward a flooded DETACH.request is global. Therefore, the detached terminal receives a DETACH.request and quickly learns that it has been detached. All bridge nodes, which receive the DETACH.request, add the detached terminal to their detached-node-list. These lists are broadcast in HELLO packets for HELLO-times or until the bridge determines the terminal has reattached.

All attached non-terminal nodes broadcast periodic HELLO packets in discrete HELLO-slots at calculated intervals. Nodes learn which HELLO-slots are busy and refrain from transmitting during the occupied region of busy HELLO-slots. Bridge nodes do not transmit HELLO packets in busy HELLO-slots.

The HELLO packet contains a "seed" field used in a randomization algorithm to determine the next HELLO-slot for the transmitting node and the next seed. The address of the transmitting node is used as a factor in the algorithm to guarantee randomization. Nodes can execute the algorithm "i" times to determine the time (and seed) of the "i-th" HELLO packet from the transmitter. After attaching, a bridge chooses a random initial seed and a non-busy HELLO slot and broadcasts a HELLO packet in that slot. The bridge chooses succeeding HELLO slots by executing the randomization algorithm. If an execution of the algorithm chooses a busy slot, the next free slot is used and a HELLO "displacement" field indicates the offset from the calculated slot. Cumulative delays are not allowed (i.e, contention delays during the "i-th" HELLO transmission do not effect the time of the "i+1" HELLO transmission). In addition, default HELLO-TIME and HELLO-SLOT-TIME values are set at compile time and are well-known by all nodes. Modified HELLO-TIME and HELLO-SLOT-TIME values are set by the root node and are advertised throughout the network in HELLO packets. The HELLO-SLOT-TIME values must be large enough to minimize HELLO contention.

A node initially synchronizes on a HELLO packet from its parent. A SLEEPING node can calculate the time of the next expected HELLO packet from its parent and can power-down with an active timer interrupt set to wake it just before the HELLO packet is transmitted. The bridging entity in a parent node can store messages for SLEEPING nodes until the message are requested. A-terminal learns that it must request a saved message by examining the pending message list in the HELLO packet. This implementation enables SLEEPING terminal to receive unsolicited messages and relaxes the timing constraints for transaction oriented messages. Retries for pending messages are transmitted in a round-robin order when messages are pending for more than one destination.

The bridging layer does not provide a reliable end-to-end service, thus lost and duplicate packets are handled by a higher layer. The bridging layer does not fragment packets and packets are normally delivered in sequence.

The data-link layer is implemented as an extension of Class 2 (LLC) (Logical Link Control as defined in ISO Standard 8802-2.2. The extensions to LLC are: an additional unnumbered command frame—SABMX, and 15-bit send and receive sequence numbers. In addition, the implantation must include an adaptive time-out algorithm for retransmissions. Unreliable ("type 1") and reliable ("type 2") connection-oriented services are provided. The unreliable service is provided for terminals which support a reliable end-to-end transport protocol with a host computer. LLC type 2 provides a reliable end-to-end transport service for long-lived terminal-to-terminal connections within the spanning tree network. A fast-connect VMTP-like transport protocol is used for transient terminal-to-terminal connections. The VMTP-like service is primarily provided for Remote Procedure Calls (RPC), client/server transactions, and short mail messages.

The interfaces to the next upper (i.e. application) layer include:

1) handle=CONNECT(destination, . . . );
2) handle=LISTEN($$AP, . . . );
3) SEND(handle, buffer, length, [destination]);
4) DATAGRAM(handle, buffer, length, [destination]);
5) TRANSACTION(handle, tx-buf, tx-len, rx-buf, max-rx-len, IDEMPOTENT, destination);
6) RECEIVE(handle, buffer, max-length, [destination]);
7) PENDING_MESSAGE(handle, [destination]); and
8) DISCONNECT(handle).

Designation fields are formed by concatenating the destination service access point (DSAP) with the destination network address where aliases are used for both. For example, 3270@HOST1 might designate a 3270 terminal controller application in a controller node. The DSAP can specify a remote terminal application or the access point to a higher layer protocol in a remote node. More specifically, the "handle" designates the connection type and is the connection identifier for LLC connections. The optional "destination" filed in send and receive operation is only used for the VMTP-like interface. SEND messages require a response. DATAGRAM messages are used to send messages to a hose which is capable of supporting end-to-end host-to-terminal transport connections and do not require a response. TRANSACTION is used to send transaction-oriented messages with the VMTP-like facility. An error occurs if a return message is not received in a TRXN-TIME-OUT period. The data-link/transport entity saves response messages and resends the response when a duplicate transaction message is received. In addition, an application can mark a transaction as redoable, by setting the IDEMPOTENT flag ON. In this case, the response message is not saved and the response is regenerated by re-executing the transaction. A response message can be guaranteed in the form of an acknowledgment from a higher layer protocol.

Because the bridging layer provides an unreliable service, the data-link layer is required to detect duplicate packets and retransmit lost packets. Detecting duplicates is facilitated by numbering data-link packets with unambiguous sequence numbers.

LLC type 2 connections are established by sending a SABMX control frame to the destination network address. To prevent frames from old connections from being accepted (i.e. with a sequence number of "0") the node which initiates a connection must ensure that at least MAX-PACKET-LIFE time has expired since the last connection before issuing a new CONNECT for the same destination. Because of the required waiting period, type 2 LLC connections are not ideal for the type of transient connections needed to reliably facilitate remote procedure calls, client/server transactions, and sporadic mail messages.

LLC frames are sequenced from zero ("0") to MAX-SEQ. The maximum number of outstanding frames (i.e., transmitted but not acknowledged) is LLC-WINDOW-SIZE. The default value LLC-WINDOW-SIZE is relative small, but the window size may be expanded with an XID frame. Because all frames sent during a connection may not follow the same path, no more than MAX-SEQ frames may be sent in a MAX-PACKET-LIFE time period.

A problem can arise when a node successfully transmits a data-link frame to the next downstream hop on a busy path but loses all acknowledgments. At this point, the node is detached and must quickly reattach to the spanning tree. If the next parent of the node is on a shorter, less busy branch, frames on the new path can easily arrive at the destination while old frames still exist in the old path. MAX-PACKET-LIFE is equal to MAX-HOPS multiplied by XMIT-Q-SIZE multiplied by MAX-RETRY-TIME, where MAX-HOPS is the maximum length of a branch of the spanning tree in hops, XMIT-Q-SIZE is the number of packets which can be queued in each node, and MAX-RETRY-TIME is the maximum time the MAC layer can spend retrying a frame before it is successfully sent. This problem is solved by increasing the size of the send and receive sequence number fields (i.e. from 7 bits to 15 bits) so that the N(S) and N(R) fields in an information frame can never roll over faster than MAX-PACKET-LIFE time. Note that the spanning tree topology insures that packets will not loop.

VMTP-like connection records are built automatically. A VMTP-like connection record is built or updated whenever a VMTP-like transport message is received. The advantage is that an explicit connection request is not required. A VMTP-like connection is half-duplex. It is contemplated, however, that a full-duplex connection at a higher layer could be built with two independent half-duplex VMTP-like connections. Acknowledgements must be handled by higher layers. Connections are defined by the concatenated network end-to-end destination and source addresses and service access points. The LLC type 2 data-link entity in a node stores messages for possible retransmission. Retransmissions may not always follow the same path primarily due to moving terminals and resulting changes in the spanning tree. For example, the bridging entity in a parent node may disconnect a child after the MAC entity reports a message delivery failure. The child soon discovers that it is detached and reattaches to the spanning tree. When the data-link entity in the root resends the message, it follows the new path.

The data-link entity in a terminal calculates a separate time-outs for SEND and TRANSACTION operations. Initially, both time-outs are a function of the distance of the terminal from the root node. A TCP-like algorithm is used to adjust the expected propagation delay for each message type to the end-to-end distance and load without causing sporadic changes or dramatic swings in time-out values. Messages, which require a response, are retransmitted if twice the expected propagation time expires before a response is received. SLEEPING terminals can power down for a large percentage of the expected propagation delay before waking up to receive the response message. Missed messages may be stored by the bridging entity in a parent node for a predetermined number of HELLO times.

The MAC layer is responsible for providing reliable transmission between any two nodes in the network (i.e. terminal-to-bridge). Access to the network communications channel is regulated in several ways. First, the HELLO protocol, described above, reduces contention for HELLO packets. Second, nodes are grouped into logical coverage areas associated with a single bridge node. CSMA and LBT algorithms are used to gain access to the channel. Lastly, a polling protocol reduces contention for data frames.

IEEE 802.3 media access control is used for ethernet links. A p-persistent CSMA/CA with ARQ (automatic retry request) protocol is used to gain access to the channel on the RS485 LAN. In addition, a collision avoidance protocol is implemented on RS485 LAN links. Bridging layer packets are typically sent in a single MAC layer data frame on both ethernet and RS485 LAN links. Short blocks can be transmitted as soon as an idle channel is detected. Before a long data frame can be transmitted on a wired link a potential transmitter must sense an idle channel, transmit an RFP frame and receive a POLL frame from the receiver. After a data frame is transmitted, the receiver notifies all listening nodes that the channel is free by sending a CLEAR frame.

A simple return priority mechanism is implemented by requiring a potential transmitter to sense an idle line for an IDLE-TIME period which exceeds the maximum transmitter/receiver turnaround time. The recipient of a unicast frame "owns" the channel for the turnaround time and can respond without executing the CSMA algorithm. This approach makes response times more deterministic and allows the sender to set response time-outs tightly. Short time-outs allow transmitting nodes to quickly retry out and discover disconnected links.

A CSMA random-backoff algorithm specifies backoff delays as a function of the CSMA slot time. A CSMA slot is calculated as a function of the worst-case carrier-sense ambiguous period. If, for example, in the worst case, it takes a character-time to determine that a frame is in progress then the CSMA slot time is defined to be slightly longer than one character time. The algorithm divides the sense time into "p" contiguous slots and chooses a number, "i", between one ("1") and "p". If the first "i" slots are idle then the algorithm allows transmission in the "i+1" slot. If one of the first "i" slots is busy, the device executing the algorithm listens until the channel is idle and re-executes the algorithm.

A polling protocol, which is consistent with the collision avoidance protocol used on wired links, is used to gain access to the channel on spread spectrum radio links. The polling protocol reduces contention in an environment with hidden terminals in several ways. On radio links, a MAC transmitter fragments a bridging layer packet into short fixed length frames before the packet is sent. The fragments are reassembled by the receiver and are posted to the receiver's bridging layer if, and only if, all frames in the packet are received. A group of frames which is associated with a single bridging layer packet is called a bracket. Fragmentation at the MAC layer allows the MAC entity to used a (shorter) frame size which is suitable for the like error rate without impacting packet sizes at the bridge layer.

Additionally, the polling radio link protocol generally limits contention of RFP frames. Before a bracket of frames can be transmitted on a radio link, a potential transmitter must sense an idle channel, transmit an RFP frame and receive a POLL frame from the receiver. If the receiver is busy it responds with a wait-for-poll (WFP) frame. The WFP frame positively acknowledges the RFP frame and causes the transmitter to wait for a POLL frame. Nodes are queued for polling in the order in which RFP frames arrive. After the last frame in a bracket is transmitted and successfully received, the receiver sends a CLEAR frame to notify all listening nodes that the channel is open.

In summary, the MAC layer:
1. accepts frames from the bridging layer and passes frames to the physical layer for transmission;
2. appends MAC layer framing bytes and CCITT-16 FCS bytes to transmitted frames;
3. removes MAC layer framing bytes and FCS bytes from received frames;
4. verifies the FCS bytes in received frames;
5. filters out frames-which do not belong to the SST network on the local device;
6. filters out packets which are not directed to the local device;
7. forwards packets to the bridging layer which are directly addressed to the local device, or are broadcast or multicast to the local device;
8. regulates access to the communications channel on RS485 links and spread spectrum radio links;
9. schedules lost unicast frames for retransmission;
10. detects and discards duplicate back-to-back unicast MAC level data frames;
11. provides device-to-device flow control;
12. transparently fragments and reassembles bridging layer packets, which exceed the maximum MAC frame size; and
13. maintains and provides diagnostic statistics for higher layers.

Before delving into the specifics of the MAC layer a few points must be clarified. First, p-persistent CSMA/CA (carrier sense multiple access with collision avoidance) protocol is used to gain access to an RS485 LAN. The collision avoidance scheme gives channel access priority to the recipient of a unicast frame. Second, on lightly loaded spread spectrum radio links, a non-persistent CMA algorithm is used to gain access to the communications channel. Third, on moderately to heavily loaded spread spectrum radio links, an LBT/BP (listen-before-talk with busy pulse) algorithm is used to gain access to the channel and minimize the effect of hidden nodes. An LBT slot is defined as the total time required to transmit an RFP (request-for-poll) frame plus the time required by the receiver to begin transmitting the response. Finally, CSMA idle time is the minimum time that a potential transmitter must sense an idle channel before assuming the channel is idle. The CSMA idle time is greater than the interframe gap plus the CSMA slot size. LBT idle time is the minimum time that a potential transmitter must sense an idle radio channel with hidden nodes before assuming the channel is idle. The LBT idle time is greater than the interpoll gap time plus the CSMA slot size.

MAC-level frames are categorized as either request or poll frames. The DATA, FRP and ENQ frames are request frames while POLL, WFP, CLEAR and REJECT frames are poll frames. More specifically, a DATA frame is a MAC-level request frame which is used to send higher-layer data to a receiver.

An EOD (end-of-data)frame is a MAC-level request frame which is sent as the last data frame in a bracket of one or more data frames. Note that a bracket of data frames may consist of a single EOD frame. An FRP (request-for-poll) frame is a MAC-level request frame which is used to request polling from a receiver and to determine the SEQ state of the receiver. An ENQ (enquiry) frame is a MAC-level request frame which is used to determine the SEQ state of a receiver and to determine if a node is within range. A POLL frame is a MAC-level poll frame which is used to obtain a data frame from another node and to return the current SEQ state.

A WFP (wait-for-poll) frame is a MAC-level poll frame which is used to inform a requesting node that it is scheduled to be polled later and to return the current SEQ state. A CLEAR frame is a MAC-level poll frame which is used to inform all listening nodes that the last frame in a bracket of frames has been received and to return a defined SEQ state. A REJECT frame is a MAC-level poll frame which is used to return an undefined SEQ state or to indicate that a received request frame was invalid.

Each request or poll frame contains a control byte wherein each bit represents an element of information or control.

Three categories of bits in the control bytes of the request frame and the poll frame are the same. These bits are: 1) the R/P bit is used to distinguish MAC layer request and poll frames. If the R/P bit is set OFF the frame is a request frame. If the RIP bit is set ON the frame is a poll frame. 2) The SEQ bit is used to sequence MAC layer data frames, modula 2. The SEQ field is used to detect and discard duplicate packets. A state machine which illustrates the use of the SEQ bit and the response ACC bit is shown below; 3) The LAD ID bits. The MAC frame belongs to the spanning tree specified by the LAN ID bits. The MAC entity discards frames which belong to spanning trees which are not in its LAN_ID_list. Note that LAN_ID_list is a parameter of the MAC_enable call.

The request frame control byte further includes a Data bit, MORE bit and priority bit. The DATA bit is used to distinguish control request frames from data request frames. In control request frames the MORE bit is used to distinguish RFP frames from ENQ frames. In data request frames, the MORE bit is used to distinguish between DATA frames and EOD frames. The last frame sent in a bracket of data frames is always an EOD frame.

The Priority bit includes the priority of a higher layer message and is set as specified by the bridging layer, in the MAC_send call. The receiver simply passes the priority to the bridging layer. The Priority bit value is the same for all frames which are associated with a bracket of frames.

The poll frame control byte further includes a MORE bit and WAIT bit. The MORE bit is used to distinguish POLL frames from CLEAR frames. The WAIT bit is used to distinguish POLL frames from WFP frames. The receiver of a request frame can return a poll frame with the WAIT bit set ON in the associated poll frame to put the requesting node in a quiet state for WFP-TIMEOUT seconds. The requesting node must refrain from transmitting unicast frames to the receiver until the quiet period expires or a POLL frame is received from the receiver. In addition, a REJECT frame is specified by setting the MORE bit OFF and the WAIT bit ON.

Each node in the network has a single bridging entity which invokes a MAC entity per port to send and receive messages on the port. MAC layer services are provided with the following software routines:
1) MAC_enable (port, LAN_ID list);
2) MAC_set-address (port, net_address);
3) MAC_send (port, desk_net_address, buffer, control_flags, [mailbox], [queue]);
4) length=MAC_accept (port, buffer, wait);
5) MAC_stop (port);
6) MAC_start (port);
7) MAC_disable (port);
8) MAC-enquiry (port, desk_net_address); and
9) MAC-diagnostic (port, . . . ).

Initially, the MAC entity attached to a port is in a DISABLED/OFF state. The bridging layer enables a MAC entity on a port by calling MAC-enable (port, LAN-ID-list), where LAN-ID-list defines the spinning trees to which the node can belong. MAC-enable. changes the MAC entity state to ENABLED/ON.

The MAC entity uses a default multicast address consisting of the node type and a node identifier of all 1's, until the bridging layer assigns a specific network address to the MAC entity. The MAC-set-address call is provided for this purpose.

The bridging layer accepts messages from the MAC entity by issuing a MAC-accept call. The returned buffer includes the MAC header, but does not include media framing and CRC characters. The wait parameter can be used to suspend the caller for some length of time or until a message is received. The MAC entity must be capable of queuing messages until they are accepted by the bridging layer.

The bridging layer requests the MAC entity to transmit a bridging layer packet by issuing a call to MAC-send. Packets are grouped into a set of one or more MAC layer frame which, together, constitute a bracket. On radio ports, if the size of a bridging layer packet exceeds the maximum MAC frame length, then the packet is fragmented. A bracket normally contains a single data (EOD) frame on wired links. The MAC entity prefixed a MAC header to the beginning of each frame in a bracket before transmitting each frame. The MAC layer is also responsible for providing media framing, which includes a link-type dependent synchronization preamble, start-of-frame delimiter, end-of-frame delimiter, and CRC-CCITT frame check sequence bytes for each frame. The control-flags parameter in the MAC-send call is used to: 1) set the priority bit in the MAC header (priority); 2) to indicate if the buffer is being sent in response to a multicast bridging layer packet (p-flag); and 3) to set the LAN ID field in the MAC header. The optional mailbox and queue parameters are mutually exclusive and: are used for asynchronous calls. Also, the maximum size of a buffer passed to the MAC layer for transmission is MAX-PKT-SIZE. The bridging layer can disable the MAC receiver by calling MAC-stop. The MAC entity is in an ENABLED/OFF state after a call to MAC-stop is used. The bridging layer forces the MAC entity back into the ENABLED/ON state by calling MAC-send or MAC-start. The bridging layer can disable the MAC entity and force it to the DISABLED/OFF state by calling MAC-disable. In addition, MAC-enquiry can be used to determine if a destination node is within range, and MAC-diagnostic is used to retrieve diagnostic statistics from the MAC layer.

When the MAC entity is in an ENABLED/ON state it is continuously listening on its assigned port. The MAC entity receives all MAC layer frames. Frames which do not pass a CRC-CCITT check are invalid and are discarded. Valid data frames are reassembled into a complete packet which is posted to the bridging entity if: 1) the LAN ID in the MAC header is among those contained in the LAN ID list passed to the MAC entity in the MAC-enable call; and 2) the destination address in the MAC header is equal to the network address of the local node, or is unacceptable multicast or broadcast address.

The high-order multicast bit is set ON in all multicast or broadcast frames. A multicast or broadcast frame is accepted if the node type specifies a group to which the local node belongs and either the node identifier is all ones ("1's"), or the node identifier is equal to the identifier of the local node. A response is never required when the multicast bit is set ON.

A default network address used when the MAC entity is first enabled consists of the multicast node type concatenated with a node identifier of all ones. For example, the default address for a bridge is hexadecimal A7FF. The bridging layer is responsible for obtaining a network address and assigning it to the MAC entity on the port.

A return priority mechanism is used to group MAC layer request and poll frames into a single CA sequence. A channel access algorithm is executed to gain access to the channel before the first frame in a CA sequence is transmitted. All other frames in a CA sequence may be sent without executing the channel access algorithm. The idle time between frames which belong to a single CA sequence must be less than the maximum interfame gap time. On wired links, the CSMA/CA algorithm forces nodes to detect an idle channel for CSMA idle time which exceeds the interframe gap time before initiating a CA sequence. On radio links "hidden nodes" can cause throughput to be significantly degraded on spread spectrum radio links. Under lightly loaded conditions, a CSMA channel access algorithm allows nodes to access the radio channel immediately after detecting an idle channel. Under moderate to heavily loaded conditions, the LBT/DP algorithm forces nodes to detect an idle radio channel for an LBT idle time which exceeds the interpoll gap time before accessing the channel. By listening for longer than the interpoll gap time, a node will detect a conversation in progress, if both involved nodes are in range or only one node is in range and the other node is hidden. Limiting the time between frames in a CA sequence to a short fixed interval, essentially provides a busy-pulse signal which spans the coverage area of both nodes involved in a conversation.

A CA sequence of frames begins with the transmission of a request or poll frame, following an execution of the channel access algorithm. Possible successive frames in a CA sequence are: 1) any poll frame sent in response to a unicast request frame; 2) a DATA or EOD frame sent in response to a POLL frame; or 3) a bridge node can "piggyback" a second frame onto a transmitted broadcast, multicast, WFP, CLEAR, or REJECT frame, by transmitting the second frame within the interframe gap time.

The size of packets which are passed to the MAC layer by the bridging layer must be less than or equal to MAX-PKT-SIZE, where MAX-PKT-SIZE specifies the total length of the packet, including bridging and data-link header characters.

Packets which are larger than MAX-FRAME-SIZE must be fragmented, by the MAC entity, to insure that the interpoll gap time is constant. The fragmented frames are transmitted as a bracket with the MORE bit set OFF in the last frame to mark the end of the bracket. Frames which belong to a single bracket are reassembled by the MAC entity in the receiver before the packet is posted to the bridging layer in the receiver. If the entire bracket is not received successfully, all other frames in the bracket are discarded by the receiver. The maximum number of data frames in a bracket is the ceiling of MAX-PKT-SIZE/MAX-FRAME-SIZE.

MAX-FRAME-SIZE does not include characters added at the MAC level. MAX-FRAME-SIZE on the 192K bps spread spectrum radio link is limited by the interpoll gap time. On a wired links with low error rates, MAX-FRAME-SIZE is set so that a bracket is generally limited to a single LIMITED frame.

A bracket of frames may be transmitted in one or more CA sequences where a channel access algorithm is used to gain access to the link for each CA sequence. A transmitter initiates the transmission of a bracket of frames by sending either an RFP frame or an EOD frame to a receiver. If a receiver is not busy, the receiver responds to RFP and DATA frames with a POLL frame, which solicits the next DATA frame and implicitly acknowledges the previous frame. A receiver responds to an EOD frame with a CLEAR frame. If a receiver is busy or does not have a buffer, the receiver may respond to RFP, DATA or EOD frames with a WFP frame.

The node which initiates a bracket of frames (i.e., the transmitter) is responsible for recovery until the first POLL frame is received. The receiver is responsible for polling the transmitter as soon as an RFP frame is received and assumed responsibility for recovery at that point. It is possible for both the transmitter and receiver to be in contention to recover a lost frame (i.e., RFP or DATA) if the POLL frame is lost. The contention is resolved with a random backoff algorithm. If a CLEAR frame is lost and the polling node which sent the CLEAR frame is responsible for recovery, the requesting node which initiated the bracket cannot determine if the link was lost or the CLEAR frame was lost. The requesting node must send an ENQ frame to determine which case holds.

This preferred embodiment utilizes a state machine (SM) to control network communication. No state machine is required for multicast and broadcast frames, however. Multicast and broadcast frames can be transmitted whenever the channel is available. Received multicast or broadcast frames are simply discarded or posted to the bridging layer. Various state machines are used to handle other communication aspects. These include the bracket-transmit, bracket-receive, receive-SEQ-control and transmit-SEQ-control state machines.

Specifically, the bracket-transmit state machine used provides IDLE, READY, S-RFP, S-DATA, S-EOD, READY2 and S-EOD2 states. The IDLE state causes this state machine to idle, waiting a bracket of frames to transmit. The READY occurs when the state machine has a bracket of one or more frames to transmit and is waiting to acquire the channel. The S-RFP state occurs when the state machine has sent an RFP frame and is waiting for a POLL frame. The S-DATA state occurs when the state machine has sent a DATA frame and is waiting for a POLL frame. The S-EOD state occurs when the state machine has sent an EOD frame after receiving a POLL frame and is waiting for a CLEAR frame. The RDY-WAIT state occurs when the state machine has received a WFP frame and is waiting for a POLL frame (or timeout).

The READY2 and S-EOD2 states only apply to transmissions on a wired link which are not initiated with a request for polling. The READY2 state occurs when the state machine has a single short frame to transmit, is waiting to acquire a wired link, and the SEQ state of the receiver is known. The S-EOD2 state occurs when the state machine has sent an unsolicited EOD frame is waiting for a CLEAR frame.

There is an automatic and immediate transition from the READY state to the READY2 state if the communications channel is a wired link, the SEQ state of the receiver is known, and the bracket to transmit consists of a single EOD frame which is less than MAX-SHORT-FRAME-SIZE in length.

The state machine also uses various timers. A RP-TIMEOUT receive timer is started when an RFP frame is transmitted, an ENQ frame is transmitted, and (on wired links), when an EOD frame is sent without first sending an RFP frame. The timeout value is larger than interframe gap time plus the time required to transmit a POLL or CLEAR frame. If the RSP-TIMEOUT timer expires before an expected response is received, a retry counter is incremented and the request frame is retransmitted, if the retry count has not been exceeded.

A POLL-TIMEOUT receive timer is also used. This timer is started whenever a DATA or EOD frame is transmitted following an RFP frame. The timeout value is larger than the time required for the maximum number of poll retry attempts. The MAC layer returns an error to the bridging layer if this timer expires before an expected poll frame is received. Note that the receiver is responsible for recovery when this timer is running. Similarly, a WFP-TIMEOUT timer is started whenever a WFP frame is received. The RDY-WAIT state ends when this timer expires or a POLL frame is received.

The state machine must maintain a "current pointer" variable which points to the current frame in a bracket of frames to be transmitted. The current pointer is advanced if, and only if, a POLL for the next frame in the bracket is received. If more than one transition is specified when a POLL frame is received, the state of the current pointer determines which transition should be taken.

In the bracket-receive state machine, an assumption is made that invalid frames and frames not directed to the local node are discarded and do not affect state transitions. Multicast and broadcast frames are simply posted to the bridging entity, if a buffer is available, and do not affect state transitions.

There are three states in the bracket-receive state machine: 1) IDLE-LISTEN; 2) BUSY; and 3) BUSY-WAIT. The IDLE-LISTEN state occurs whenever the receiver is not receiving a bracket of frames. The BUSY state occurs when the receiver has sent a POLL frame and is waiting for the next frame in a bracket. Finally, the BUSY-WAIT state occurs when the receiver is waiting for a buffer to become free.

The bracket-receive state also uses the RSP-TIMEOUT and WFP-TIMEOUT timers. Specifically, the RSP-TIMEOUT timer is started when a POLL frame is transmitted. The timeout value is larger than interframe gap time plus the time required to transmit a DATA frame. If the RSP-TIMEOUT timer expires before an expected response is received, a retry counter is incremented and the POLL frame is retransmitted, if the retry count has not been exceeded. The receiver must maintain a poll-queue which is a FIFO list of all terminals which have requested polling. Entries in the queue are aged so that they are discarded after WFP-TIMEOUT seconds. The entry at the front of the queue is considered active; all other entries in the queue are denoted as queued. Nodes which are not active nor queued are denoted as inactive. Note that there is no active node in the IDLE-LISTEN state. Additionally, a separate queue can be used for high priority requests.

A SEQ state variable is cached for all nodes which have recently transmitted valid data frames. The SEQ state variable is updated as specified in the section which describes state machines for frame SEQ control.

Only one bracket may be in progress at a time. The receiver must reserve enough buffers for an entire bracket of frames before sending a POLL frame in response to an RFP frame. This ensures that the entire bracket will be accepted.

All unicast MAC data frames are sequenced with a 1-bit sequence number (SEQ). The sequence number is used to detect lost data frames and duplicate data frames. The MAC entity in each node must maintain transmit and receive SEQ state tables for unicast messages. The receive SEQ state table contains an entry for each active MAC source node. The transmit SEQ state table contains an entry for each active destination node. Each entry consists of a 1-bit SEQ state variable and a network address only unicast command frames affect state table entries. As a rule, a receive table entry should be discarded before the counterpart transmit table entry (i.e., in another node) is discarded. Receive SEQ state table entries need only be kept long enough to ensure that retransmitted duplicates are not mistaken for valid frames. This implies that receive table entries must be kept for a period longer than the maximum transmit retry time for a single frame. An entry in the transmit SEQ state table can be kept until the space is required for a new entry. Strict state timing is not required because a transmitter, (without a table entry for a potential receiver), can determine the state of a receiver, (with an RFP frame), before transmitting data frames. Also, the MAC layer does not provide a reliable service. Lost frames and duplicates are detected by higher layers.

The receive-SEQ-control and transmit-SEQ-control state machines specify how entries in the SEQ state tables are maintained. The use of the term "poll" is used to denote any poll frame (i.e., POLL, WFP, CLEAR, or REJECT) and the term "data" is used to denote any data frame (i.e., DATA or EOD).

Move specifically, the receive-SEQ-control state machine uses three states: 1) ACCEPT-0; 2) ACCEPT-1; and 3) ACCEPT-ANY. In the ACCEPT-0 state, the receiver expects the next DATA or EOD packet to have a SEQ number of 0. In the ACCEPT-1 state the receiver expects the next DATA or EOD packet to have a SEQ number of 1. Finally, in the ACCEPT-ANY state the receiver will accept a DATA or EOD packet with a SEQ number of 0 or 1.

The MAC receiver caches receive SEQ state variables for active external source nodes. The variable can be set to one of three states listed above. A state of ACCEPT-ANY applies to all nodes which do not have entries in the receiver's SEQ state table. The receiver sets the SEQ bit in a poll frame to denote the next frame that the receiver expects.

The transmit-SEQ-control state machine also utilizes three states: 1) SEND-0; 2) SEND-1; and 3) UNKNOWN. In the SEND-0 state, the transmitter sends the current data frame with a SEQ number of 0 and expects a POLL or CLEAR with a SEQ number of 1. In the SEND-1 state the transmitter sends the current data frame with a SEQ number of 1 and expects a POLL or CLEAR with a SEQ number of 0. In the UNKNOWN state, the transmitter must send an RFP or ENQ frame to determine the SEQ state of the receiver.

The MAC transmitter maintains a transmit SEQ state variable per external node. The transmitter sends the SEQ field in DATA and EOD frames to the value of the transit SEQ state variable. The state variable can be in one of the three states listed above. The UNKNOWN state applies to all nodes which do not have entries in the transmitter's state table. If the state is UNKNOWN, the transmitter sends an RFP or ENQ frame to determine the SEQ state of the receiver before sending a data frame. On radio links, the SEQ state is set to UNKNOWN as soon as the transmission of frames is completed.

The SEQ field in a poll frame denotes the next data frame expected. Each time a poll frame is received, the transmit SEQ state variable associated with the source of the poll frame is set to the value of the poll frame's SEQ field. A "current pointer" points to the current data frame in a bracket of data frames. The current pointer is advanced if the current data fame has been transmitted with a SEQ field value of "0" ("1") and a poll frame is received with a SEQ field value of "1" ("0").

Various network constants are also used in this preferred embodiment. These include:

| | | |
|---|---|---|
| 1) | WFP-TIMEOUT | (1 second) this is the time that a node remains in a quite state waiting for a POLL frame after a WFP frame is received; |
| 2) | MAX-PKT-SIZE | (800 bytes) this is the maximum size of a bridging layer packet including bridging header characters; |
| 3) | R-MAX-FRAME-SIZE | (100 bytes) this is the maximum size of a MAC layer frame on the spread spectrum radio link, not including MAC header and framing characters; |
| 4) | W-MAX-FRAME-SIZE | MAX_PKT_size, is the maximum size of a MAC layer frame on the RS485 LAN, not including MAC header and framing characters; |
| 5) | W-MAX-SHORT-FRAME-SIZE | (200 bytes) this is the maximum size of a MAC layer frame which can be transmitted without first sending a RFP frame on the RS485 LAN; |
| 6) | W-SLOT-SIZE | (50 microseconds) this is the CSMA slot size for the RS485 LAN; |
| 7) | W-INTERFRAME-GAP | (200 microseconds) this is the maximum interframe gap time for the RS485 LAN. |
| 8) | W-IDLE-TIME | (W-INTERFRAME-GAP + W-SLOT-size + 50 microseconds) this is the CSMA idle time on the RS485 LAN; |
| 9) | R-SLOT-SIZE | (1000 microseconds) this is the LBT slot size on the spread spectrum radio link; |
| 10) | R-INTERPOLL-GAP | (500 microseconds) this is the interpoll gap time on the spread spectrum radio link; and |
| 11) | R-IDLE-TIME | (R-INTERPOLL-GAP) this is the LBT idle time on the spread spectrum radio link. |

THE CSMA/CA channel access algorithm used on the RS485 LAN differs from the LBT algorithm for radio links because of the hidden terminal factor in the radio network. Particularly, the p-persistent CSMA/CA algorithm forces all nodes to detect an idle channel for one CSMA idle time unit, where a CSMA idle time unit is greater than the interframe gap time, before the channel is considered free. If a node initially detects a free channel, it can transmit immediately. If a node detects a busy channel, it listens to the channel until it becomes free. When the channel becomes free, at that point, time is divided into "p" CSMA slots. The node selects one of the "p" slots, "i", at random. If the channel is idle for the first i−1 ("i" minus one) slots, the node transmits in slot i. If the channel becomes busy in one of the fist i−1 slots, the process is repeated. If an expected response is not received, a node chooses a number, "i", between one ("1") and p, and delays for "i" CSMA slots before re-executing the CSMA algorithm to retransmit. The number of backoff slots, p, is given as an increasing function of the number of missed responses and busy channel directions.

The LBT algorithm functions as a pure CSMA algorithm when the channel is lightly loaded. A channel is allowed to transmit as soon as an idle channel is detected. CSMA is never used for retransmissions. When the channel is moderately to heavily loaded, the LBT algorithm forces all nodes to detect an idle channel for at least one LBT idle time unit, (this unit being greater than the interpoll gap time) before the channel is considered free. If a node initially detects a free channel, it can transmit immediately. If a node detects a busy channel, it listens to the channel until it becomes free. When the channel becomes free, at that point, time is divided into "p" LBT slots. The node selects one of the "p" slots, "i", at random. If the channel is idle for the first i−1 slots, then the node will transmit in slot i. If the channel becomes busy in one of the first i−1 slots, the process is repeated. If an expected response is not received, a node chooses a number, "i", between one ("1") and "p", and delays for "i" LBT slots before re-executing the LBT algorithm to retransmit. The number of backoff slots, "p", is given as an increasing function of the number of missed responses and busy channel detections.

The CSMA/CA algorithm for the RS485 LAN, and the LBT/BP algorithm for spread spectrum radio links are both shown in pseudo-code in Appendix A.

Figure 9:
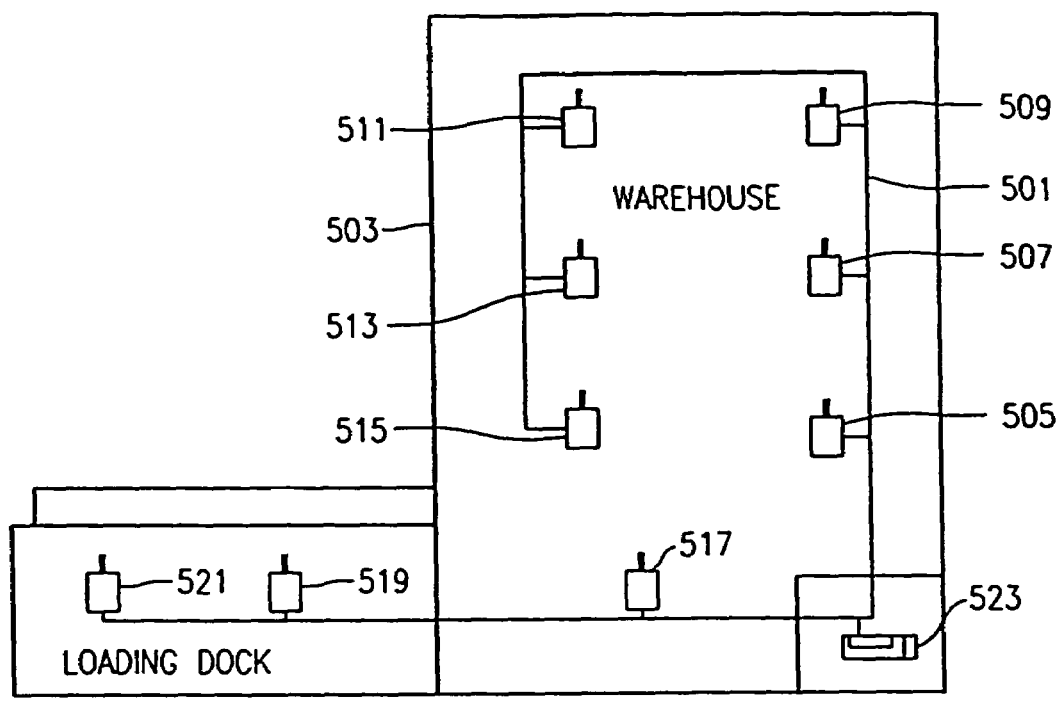
FIG. 9 illustrates the SST Multi-drop LAN using "linear" topology.

This network embodiment uses what will be referred to as "SST Multi-drop LAN" techniques herein. The SST Multi-drop LAN shown in FIG. 9 is built on what is called a "linear" topology. A single cable 501 forms a line and each device is simply connected to the line. In a typical warehouse facility 503 the multi-drop network consists of the cable 501 connecting bases stations 505-521 and 503 a controller 523. The controller 523 and the base stations 505-521 can be placed anywhere along the cable 501.

The physical length of the cable 501 depends primarily on the following:

1. the data rate used;
2. the number of devices on the network;
3. the gauge of wire used;
4. the characteristics of the wire used which includes the capacitance, 6 dbv length and twist-rate;
5. the shielding of the wire (the combination of braided and foil shields are preferred); and
6. the environment (in a heavy-industrial environment with such things as large motors that start and stop frequently, welding, ultrasonic equipment, electroplating, or other electrically noisy equipment, the distance is less).

For example, using simulated noisy environment AWG #24 wire with eight device and shielded wire, a two thousand foot cable 501 operates without problems. In preferred embodiment, the communication link utilizes NPN 321-457-001 cable (Belden 9841).

If the physical length of the cable 50 needs to be extended, an additional "network segment" can be added. Segments are linked together by repeaters. This repeater can be either a "dumb" bridge, acting to relay all information between segments, or an "intelligent" bridge, relaying information selectively. Further, the repeater does not have to be placed at the end of the communication link. As with base stations and controllers, repeaters can be placed any where it physically makes sense. Coupling transformer may be used to protect the devices from ESD, EMI, and noise.

Radio bases don't always have to be wired to the network. If a base is within radio range of another base that is connected to the network, then the first base can communicate data from terminals to the host via the second base. For wireless routing, the two coverage areas must overlap enough so that each base is within range of the other. As a result, more radio bases are needed than scenarios using hand-wired routing to the LAN.

Figure 10:
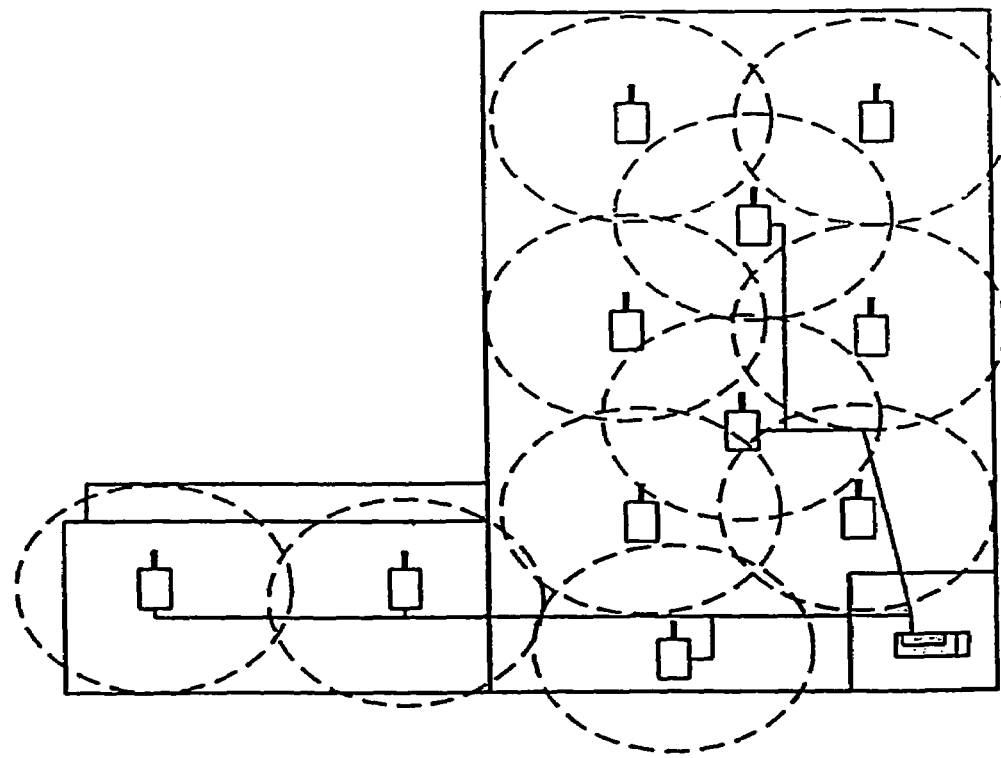
FIG. 10 demonstrates how wireless routing can reduce the amount of wiring in a warehouse facility.

As shown in FIG. 10, wireless routing can reduce the amount of wiring necessary in a facility. This arrangement requires no more than one on-the-air hop from any area, so the performance impact isn't that great.

Wireless routing is especially effective at filling in fringe areas. In the example above, the outside of the loading dock could have marginal coverage. If, once the system is installed, the coverage is this area turns out to be unacceptable, couple of wireless routers could be added to guarantee solid coverage in this area without adding any more wiring. Installation could be complete in just the time required to mount the bases. These bases need only to be taped to a wall to optimize coverage. If this solves the coverage problem, but the customer finds the performance impact unacceptable, then the new bases station could be hardwired in. Terminals being used out on the loading dock in areas where the coverage of the wireless routers and the wired bases overlap automatically switches between the wireless routers and the wired based depending on which gives the shortest path to the host. There is no danger that adding a wireless router will slow things down by causing terminals to make unnecessary on-the-air hops when they are within range of a wired base.

Another major application for wireless routers is continuing coverage when a wired base fails. A couple of wireless routers setup at ground level or perhaps duct taped a few feet up on support columns, a temporary installation that can be done with a step ladder, could easily fill in most of the blacked-out area until the failed base can be repaired.

Wireless routers can also be a real benefit for operation in temporary physical areas avoiding hard-wiring. In addition, two networks can be linked with wireless routing. In some situations, this may be a good way to eliminate multiple on-the-air hops.

Once all the network hardware is installed and on, the system configures itself and constantly reconfigures itself. As the customer moves goods around his warehouse and radio propagation inside changes, the system reconfigures to try to maintain as much coverage as it can. When a piece of equipment fails, the system reconfigures around it. If a base fails, but the area can be covered by a wireless router, the system automatically uses that router. For example, when a new wireless router is installed, it is automatically assimilated into the system within minutes of merely powering up the router. If that wireless router is hardwired it in, it automatically stops wireless routing and become a wired base. If that hardwired communication link breaks, the two resulting segments automatically begins communicating wirelessly.

Additionally, it is obvious that the embodiments of the present invention described hereinabove are merely illustrative and that other modifications and adaptations may be made without departing from the scope of the appended claims.

APPENDIX A

LBT/BP Algorithm For A Transmitter On The Radio Network.

```
BACKOFFINIT            = 20;
R_RSP_TIMEOUT          = R_INTERPOLL_GAP;
MAX-TX-TRIES           = 20;
MAX_IDLE_TRIES         = 50;
```

-continued

| LBT/BP Algorithm For A Transmitter On The Radio Network. |
|---|
| rf, rg - functions which return a maximum backoff number based on the input parameter. |
| Wait for a MAC_send call. |
| if p_flag is non-zero then |
| begin |
|     select a random number, i, between 0 and BACKOFF_INIT; |
|     SLOT_OFFSET = i R_SLOT_SIZE; |
| end |
| else |
|     SLOT_OFFSET=0 |
| TX_RETRIES=0 |
| IDLE_RETRIES=0 |
| while TX_RETRIES <MAX_TX_TRIES and |
| IDLE_RETRIES <MAX_IDLE_TRIES and |
| not OK do |
| begin |
|     OK = False; |
|     detect an idle channel for |
|     SLOT_OFFSET+R_IDLE_TIME time units; |
|     SLOT_OFFSET=0; |
|     if channel is idle then |
|     begin |
|         send_frame; |
|         if a return priority response is expected then |
|         begin |
|             wait for response or R_RSP_TIMEOUT timeout; |
|             if a valid response has been received then |
|                 OK=true; |
|             else (assume a collision has occurred) |
|             begin |
|                 TX_RETRIES_TX_RETRIES+1; |
|                 select a random number, j, |
|                 between 0 and rf(TX_RETRIES); |
|                 SLOT_OFFSET=j R_SLOT_SIZE; |
|             end |
|         end |
|     end |
|     else (the channel is not idle) |
|     begin |
|         wait until the channel is idle; |
|         IDLE_RETRIES=IDLE_RETRIES+1; |
|         select a random number, i, |
|         between 0 and rg(IDLE_RETRIES); |
|         SLOT_OFFSET=k R_SLOT_SIZE; |
| end. |

APPENDIX B

MAC Control Byte (8 bits).

Bits 7-5 in the MAC control bytes are used to specify the frame type. MAC frames are one of two basic types: 1) request, or 2) poll, depending on the state of the R/P bit.

| Request frame types. | |
|---|---|
| 000 | EOD (end-of-data) |
| 001 | DATA |
| 010 | ENQ (enquiry) |
| 011 | RFP (request-for-poll) |

| Poll frame types. | |
|---|---|
| 100 | WFP (wait for poll) |
| 101 | REJECT |
| 110 | CLEAR |
| 111 | POLL |

| Request control byte: | | |
|---|---|---|
| bit 7 | R/P | 0 = request frame |
| bit 6 | DATA | 0 = data frame |
| bit 5 | MORE | 1 = middle of bracket (DATA) |
| | | 0 = end of bracket (EOD) |
| | | 1 = RFP |
| | | 0 = ENQ |
| bit 4 | RESET | 1 = discard partial bracket |
| bit 3 | PRIORITY | 0 = normal, 1 = high |
| bit 2 | SEQ | sequence number, modulo 2 |
| bit 1-0 | LAN ID | 00, 01, 10 or 11 |

| Poll control byte: | | |
|---|---|---|
| bit 7 | R/P | 1 = poll frame |
| bit 6 | WAIT | 0 = wait for poll |
| bit 5 | MORE | 0 = clear |
| bit 4 | reserved | must be zero |
| bit 3 | reserved | must be zero |
| bit 2 | SEQ | sequence number, modulo 2 |
| bit 1-0 | LAN ID | 00, 01, 10 or 11 |

| Bridge Control Bytes (16 bits). | | |
|---|---|---|
| bit 15-14 | Bridge Header Formal | 00 = multihop, 01 = point-to-point |
| bit 13 | (reserved) | must be zero |
| bit 12 | C/R | 0 = command, 1 = response |
| bit 11 | (reserved) | must be zero |
| bit 10-8 | packet type | (see table below) |
| bit 7 | Bridge Parms | 1 = optional bridge parms |
| bit 6 | RPRQ | 1 = response packet required |
| bit 5 | (reserved) | must be zero |
| bit 4-3 | Protocol | 00 = no data-link data, 01 = LLC data |
| bit 2-0 | (reserved) | must be zero |

| Bridge Packet Types. | |
|---|---|
| 000 | Data Packet |
| 001 | Data Request Packet |
| 010 | Hello Packet |
| 011 | Attach Packet |
| 100 | Detach Packet |
| 101 | Address Resolution Packet |
| 110 | Reverse Address Resolution Packet |
| 111 | (reserved) |

| Optional Bridge Parameters - general format | |
|---|---|
| 1-bit end-of-parms flag | 1 = last option parm |
| 7-bit parm type | (see table below) |
| 1-byte parm length | length of parm value field in bytes |
| M-byte parm value | (value or list of values) |

| Optional Parameters | | |
| --- | --- | --- |
| Parm Type | Parm Length | Description |
| 01h | 2 bytes | A 2-byte network address. |
| 02h | 6 bytes | Long Identifier. |
| 03h | M*2 | Decendant List. A list of 2-byte addresses. |
| 04h | N*2 | Detached List. A list of 2-byte addresses. |
| 05h | P*2 | Pending Message list. A list of 2-byte addresses. |
| 06h | 1 byte | Distance (cost) from the root. |
| 07h | Q bytes | Well-known alias. |
| 08h | R bytes | Forward List. A list of 2-byte addresses. |
| 09h | 1 byte | Load Indicator. An indication of the channel load based on frame frequency. |
| 0Ah | S bytes | Well-known alias of the root. |
| 0Bh | 6 bytes | Long identifier of the root. |

Bridge Packet Formats.

| Data Packet Format (Type 000). |
| --- |
| MAC Header |
| Bridging Header |
| LLC Header |
| LLC Data |

| Data Request Packet Format (Type 001). |
| --- |
| MAC Header |
| Bridging Header |

| Hello Packet Format (Type 010). | |
| --- | --- |
| MAC Header | |
| Bridging Header | |
| Cost-to-root | 1 byte (0xFF = infinity) |
| Decendant Count | 1 byte |
| Next Hello | 1 byte |
| bit 7-2 seed | 6-bit randomization seed. |
| bit 1-0 hello offset | 00-10 offset in slots from calculated hello time. 11 = hello time not calculated. |
| Priority | 1 byte |
| bit 7-6 reserved | (must be zero) |
| bit 5-3 user priority | 000 = no priority  111 = highest priority |
| bit 2-0 device priority | 000 = no priority  111 = highest priority |
| Optional fields | N bytes |
| 6-byte Root ID | |
| Pending Message List | |
| Decendant List | |
| Detached List | |
| Load Indicator | |

| Attach Packet Format (Type 011). |
| --- |
| MAC Header |
| Bridging Header |

| Attach Packet Format (Type 011). | |
| --- | --- |
| Attach Parms | 1 byte |
| bit 7-3 reserved | (must be zero) |
| bit 2-0 hello save count | 000-110 = save a message 0 to 6 hello times for the attaching child. |
| Optional Attach Parms | N bytes |
| decendant list | |
| LLC message unit | |

| Detach Packet Format (Type 100). | |
| --- | --- |
| MAC Header | |
| Bridging Header | |
| Optional Detach Parms | N bytes |
| decendant list | |
| forward list | |

| Address Resolution Packet Format (Type 101).* | |
| --- | --- |
| MAC Header | |
| Bridging Header | |
| ARP Operation | 1 byte |
| bit 7-4 (reserved) | must be zero |
| bit 3-0 reason code | 0 = ok, other = error code |
| Network Address | 2 bytes |
| Long ID length | 1 byte |
| Long ID type | 1 byte |
| Long ID | N bytes |

*The Long ID can be a 6-byte identifier or an Alias. The address server will set the network address field to the network address of the associated node. If the Long ID (or Alias) cannot be found the network address field will be set to all 1's.

| Reverse Address Resolution Packet Format (Type 110).* | |
| --- | --- |
| MAC Header | |
| Bridging Header | |
| RARP Operation | 1 byte |
| bit 7 New Alias | 1 = replace existing Alias |
| bit 6 New Long ID | 1 = replace existing Long ID |
| bit 5 (reserved) | must be zero |
| bit 3-0 reason code | 0 = ok, other = error code |
| Network address | 2 bytes |
| Long ID length (6) | 1 byte |
| Long ID type (02h) | 1 byte |
| Long ID | N bytes |
| Alias length | 1 byte |
| Alias type (07h) | 1 byte |
| Alias | N bytes |

*The requesting node must set the Long ID field and/or the Alias field. The source bridge address must be set to the source node type and a node ID and all 1's. The address server will set the network address field to the next available 16-bit address. If an address is not available, the field will be set to all 1's.

What is claimed is:

1. A method of performing a data exchange over a wireless communication channel between a destination device and a sending device, the method comprising:

waiting, by the sending device, a period of time that is at least as long as a predetermined time period and detecting no communication on the wireless communication channel throughout the period of time, the predetermined time period being at least the maximum expected time span between transmissions from the destination device to a device communicating with the destination device;

after said detecting no communication on the wireless communication channel throughout the period of time, attempting, by the sending device, to initiate communication with the destination device; and if said attempt to initiate communication with the destination device proves successful, then:
transmitting, by the sending device, a series of packets to the destination device; and
after said transmitting, receiving a packet from the destination device, where said received packet indicates that the destination device successfully received the transmitted series of packets.

2. The method of claim 1, wherein the duration of the transmitted series of packets is such that the destination device may transmit return packets to the sending device, where the return packets are separated by no more than the predetermined time period.

3. The method of claim 1, wherein the duration of the transmitted series of packets is such that the destination device may transmit return packets to the sending device, where the return packets are separated by no more than the maximum expected time span between transmissions from the destination device to a device communicating with the destination device.

4. The method of claim 1, wherein the duration of each of the transmitted series of packets is such that the destination device may transmit return packets to the sending device between each of the series of packets, where the return packets are separated by no more than the predetermined time period.

5. The method of claim 1, wherein the transmitted series of packets comprises a series of data packets, each of the series of data packets having a predetermined maximum length.

6. The method of claim 1, wherein the destination device is a polling device.

7. The method of claim 1, further comprising if the beginning of the period of time through which no communication is detected coincides with the end of a detected transmission, then attempting to avoid collisions by delaying a random period before attempting to initiate communication with the destination device.

8. The method of claim 1, further comprising immediately attempting to initiate communication with the destination device, instead of waiting the period of time, if traffic on the wireless communication channel is below a predetermined level.

9. The method of claim 1, further comprising immediately attempting to initiate communication with the destination device, instead of waiting the period of time, when the sending device does not sense activity on the wireless communication channel and if traffic on the wireless communication channel is below a predetermined level.

10. A method of performing a data exchange over a wireless communication channel between a destination device and a sending device, the method comprising:
waiting, by the sending device, a period of time that is at least as long as a first predetermined time period and detecting no communication on the wireless communication channel throughout the period of time;
after said detecting no communication on the wireless communication channel throughout the period of time, attempting, by the sending device, to initiate communication with the destination device; and
if said attempt to initiate communication with the destination device proves successful, then:
communicating, between the sending device and the destination device, a series of packets, where said communicating comprises communicating at least one of the series of packets within a second predetermined time period that is less than the first predetermined time period; and
after said communicating the series of packets, communicating, between the sending device and the destination device, a packet that indicates successful communication of the series of packets.

11. The method of claim 10, wherein communicating the series of packets between the sending device and the destination device comprises transmitting each of the series of packets from the sending device to the destination device.

12. The method of claim 11, wherein communicating the packet that indicates successful communication of the series of packets comprises receiving, at the sending device, the packet that indicates successful communication of the series of packets.

13. The method of claim 10, wherein the second predetermined time period is an interpoll gap time.

14. The method of claim 10, wherein the second predetermined time period is the maximum expected time span between transmissions by the destination device to another device.

15. The method of claim 10, wherein the second predetermined time period is less than the first predetermined time period by at least the minimum duration of a data packet.

16. The method of claim 10, wherein the second predetermined time period is less than the first predetermined time period by at least the minimum duration of a data packet and an inter-packet spacing interval.

17. The method of claim 10, wherein each of the series of packets has a predetermined maximum length.

18. The method of claim 10, wherein each of the series of packets has a maximum length, the maximum length being such that the time duration between packets that are sent by the destination device is less than the first predetermined time period.

19. The method of claim 10, wherein the destination device is a polling device.

20. The method of claim 10, further comprising if the beginning of the period of time through which no communication is detected coincides with the end of a detected transmission, then attempting to avoid collisions by delaying a random period before attempting to initiate communication between the sending device and the destination device.

21. The method of claim 10, further comprising immediately attempting to initiate communication between the sending device and the destination device, instead of waiting the period of time, if traffic on the wireless communication channel is below a predetermined level.

22. The method of claim 10, further comprising immediately attempting to initiate communication between the sending device and the destination device, instead of waiting the period of time, when the sending device does not sense activity on the wireless communication channel, if traffic on the wireless communication channel is below a predetermined level.

23. A wireless communication system comprising:
a first node that operates to, at least:
wait a period of time that is at least as long as a predetermined time period and detect no communication on a wireless communication channel throughout the period of time, the predetermined time period being at least the maximum expected time span between transmissions from a second node to a node communicating with the second node;

after operating to detect no communication on the wireless communication channel throughout the period of time, attempt to initiate communication with the second node; and if said attempt to initiate communication with the second node proves successful, then:

transmit a series of packets to the second node; and after operating to transmit the series of packets, receive a packet from the second node, where said received packet indicates that the second node successfully received the transmitted series of packets.

24. The wireless communication system of claim 23, wherein the duration of the transmitted series of packets is such that the second node may transmit return packets to the first node, where the return packets are separated by no more than the predetermined time period.

25. The wireless communication system of claim 23, wherein the duration of the transmitted series of packets is such that the second node may transmit return packets to the first node, where the return packets are separated by no more than the maximum expected time span between transmissions from the second node to a node communicating with the second node.

26. The wireless communication system of claim 23, wherein the duration of each of the transmitted series of packets is such that the second node may transmit return packets to the first node between each of the series of packets, where the return packets are separated by no more than the predetermined time period.

27. The wireless communication system of claim 23, wherein the transmitted series of packets comprises a series of data packets, each of the series of data packets having a predetermined maximum length.

28. The wireless communication system of claim 23, wherein the second node comprises a polling device.

29. The wireless communication system of claim 23, wherein the first node further operates to, if the beginning of the period of time through which no communication is detected coincides with the end of a detected transmission, then attempt to avoid collisions by delaying a random period before attempting to initiate communication with the second node.

30. The wireless communication system of claim 23, wherein the first node further operates to immediately attempt to initiate communication with the second node, instead of waiting the period of time, if traffic on the wireless communication channel is below a predetermined level.

31. The wireless communication system of claim 23, wherein the first node further operates to immediately attempt to initiate communication with the second node, instead of waiting the period of time, when the first node does not sense activity on the wireless communication channel and if traffic on the wireless communication channel is below a predetermined level.

32. A wireless communication system comprising:

a first node that operates to, at least:

wait a period of time that is at least as long as a first predetermined time period and detect no communication on a wireless communication channel throughout the period of time;

after operating to detect no communication on the wireless communication channel throughout the period of time, attempt to initiate communication with a second node; and if said attempt to initiate communication with the second node proves successful, then:

communicate a series of packets with the second node by, at least in part, operating to communicate at least one of the series of packets within a second predetermined time period that is less than the first predetermined time period; and after operating to communicate the series of packets, communicate, with the second node, a packet that indicates successful communication of the series of packets.

33. The wireless communication system of claim 32, wherein the first node operates to communicate the series of packets with the second node by, at least in part, operating to transmit each of the series of packets to the second node.

34. The wireless communication system of claim 33, wherein the first node operates to communicate the packet that indicates successful communication of the series of packets by, at least in part, operating to receive the packet that indicates successful communication of the series of packets.

35. The wireless communication system of claim 32, wherein the second predetermined time period is an interpoll gap time.

36. The wireless communication system of claim 32, wherein the second predetermined time period is the maximum expected time span between transmissions by the second node to another node.

37. The wireless communication system of claim 32, wherein the second predetermined time period is less than the first predetermined time period by at least the minimum duration of a data packet.

38. The wireless communication system of claim 32, wherein the second predetermined time period is less than the first predetermined time period by at least the minimum duration of a data packet and an inter-packet spacing interval.

39. The wireless communication system of claim 32, wherein each of the series of packets has a predetermined maximum length.

40. The wireless communication system of claim 32, wherein each of the series of packets has a maximum length, the maximum length being such that the time duration between packets that are sent by the second node is less than the first predetermined time period.

41. The wireless communication system of claim 32, wherein the second node comprises a polling device.

42. The wireless communication system of claim 32, wherein the first node further operates to, if the beginning of the period of time through which no communication is detected coincides with the end of a detected transmission, then attempt to avoid collisions by delaying a random period before attempting to initiate communication between the first node and the second node.

43. The wireless communication system of claim 32, wherein the first node further operates to immediately attempt to initiate communication between the first node and the second node, instead of waiting the period of time, if traffic on the wireless communication channel is below a predetermined level.

44. The wireless communication system of claim 32, wherein the first node further operates to immediately attempt to initiate communication between the first node and the second node, instead of waiting the period of time, when the first node does not sense activity on the wireless communication channel, if traffic on the wireless communication channel is below a predetermined level.

* * * * *

UNITED STATES PATENT AND TRADEMARK OFFICE
CERTIFICATE OF CORRECTION

PATENT NO.       : 7,548,553 B2                                    Page 1 of 1
APPLICATION NO.  : 11/223404
DATED            : June 16, 2009
INVENTOR(S)      : Robert C. Meier It is certified that error appears in the above-identified patent and that said Letters Patent is hereby corrected as shown below:

On the title page, item
(56) References Cited – Other Publications, page 2, col. 2, lines 21-24,
delete "Onunga et al., "Personal Computer Communications On Intrabuilding Power Line LAN's Using CSMA With Priority Acknowledgements", IEEE Journal On Selected Areas in Communications, vol. 7, No. 2, pp. 180-191, Jan. 1989"
and insert --Onunga et al., "Personal Computer Communications On Intrabuilding Power Line LAN's Using CSMA With Priority Acknowledgements", IEEE Journal On Selected Areas in Communications, vol. 7, No. 2, pp. 180-191, Feb. 1989--.

(56) References Cited – Other Publications, insert
--Expert Report of Zymunt J. Haas, Ph.D. Regarding the Invalidity of the U.S. Patent 6,714,559, 11/27/2006--.

(56) References Cited – Other Publications, insert
--Expert Report of Peter McGuiggan, Regarding the Invalidity of U.S. Patent 6,714,559, 12/18/2006--.

(56) References Cited – Other Publications, insert
--Qualcomm Prior Art list for 6,714,559, 12/31/2006--.

Signed and Sealed this

Twenty-seventh Day of October, 2009

David J. Kappos
*Director of the United States Patent and Trademark Office*